(12) United States Patent
Cooper et al.

(10) Patent No.: US 7,693,132 B1
(45) Date of Patent: Apr. 6, 2010

(54) MULTICAST AND UNICAST MESSAGE RE-DIRECTION SYSTEM, METHOD, MESSAGE RE-DIRECTOR, AND NETWORK DEVICE

(75) Inventors: Eric Cooper, Kanata (CA); Behrouz Poustchi, Ottawa (CA)

(73) Assignee: Avaya Canada Corp., Halifax, Nova Scotia (CA)

( * ) Notice: Subject to any disclaimer, the term of this patent is extended or adjusted under 35 U.S.C. 154(b) by 1510 days.

(21) Appl. No.: 10/954,236

(22) Filed: Oct. 1, 2004

(51) Int. Cl.
  *H04L 12/56* (2006.01)
  *H04L 12/66* (2006.01)
(52) U.S. Cl. .................. 370/352; 370/390; 370/401
(58) Field of Classification Search ............... None
  See application file for complete search history.

(56) References Cited

U.S. PATENT DOCUMENTS

| | | | |
|---|---|---|---|
| 5,361,256 A * | 11/1994 | Doeringer et al. | 370/390 |
| 5,946,308 A | 8/1999 | Dobbins et al. | |
| 5,963,620 A | 10/1999 | Frankel et al. | 379/93.05 |
| 6,269,404 B1 * | 7/2001 | Hart et al. | 709/238 |
| 6,418,138 B1 | 7/2002 | Cerf et al. | |
| 6,718,361 B1 | 4/2004 | Basani et al. | |
| 6,798,773 B2 * | 9/2004 | Trossen et al. | 370/390 |
| 6,873,627 B1 * | 3/2005 | Miller et al. | 370/466 |
| 7,023,828 B2 * | 4/2006 | Korus et al. | 370/338 |
| 7,366,894 B1 * | 4/2008 | Kalimuthu et al. | 713/153 |
| 2002/0026482 A1 * | 2/2002 | Morishige et al. | 709/206 |
| 2002/0136201 A1 | 9/2002 | Buchsbaum | |
| 2003/0059005 A1 | 3/2003 | Meyerson | |
| 2003/0063608 A1 | 4/2003 | Moonen | |
| 2003/0079022 A1 | 4/2003 | Toporek | |
| 2003/0091021 A1 | 5/2003 | Trossen | |
| 2003/0104807 A1 * | 6/2003 | Momona | 455/422 |
| 2003/0191797 A1 | 10/2003 | Gurevich | |
| 2003/0204620 A1 | 10/2003 | Cheng | |

(Continued)

FOREIGN PATENT DOCUMENTS

EP    0598969    1/1994

(Continued)

OTHER PUBLICATIONS

"Multicast routing"; [online]; [retrieved Jun. 2004]; Retrieved from the Internet: <http://www.microsoft.com/resources/documentation/WindowsServ/2003/standard/proddocs/en-us/Default.asp?url=/resources/documentation/WindowsServ/2003/standard/proddocs/en-us/sag_RRAS-Ch2-Adv_8.asp>.

(Continued)

*Primary Examiner*—Hong Cho
*Assistant Examiner*—Robert C Scheibel
(74) *Attorney, Agent, or Firm*—Muncy, Geissler, Olds & Lowe, PLLC

(57) ABSTRACT

A plurality of local networks each have one or more terminal sets and a message re-director. The message re-directors are adapted to communicate with each other across another network through edge devices. The message re-directors are also adapted to convert multicast messages received locally from the terminal sets into unicast messages for transmission across the other network. The unicast messages are received by the other message re-directors. Each one of the other message re-directors then multicasts information received as part of the multicast messages received to the terminal sets within its local network.

5 Claims, 17 Drawing Sheets

U.S. PATENT DOCUMENTS

| | | | | |
|---|---|---|---|---|
| 2005/0002395 A1* | 1/2005 | Kondo | | 370/390 |
| 2005/0036482 A1 | 2/2005 | Goroshevsky et al. | | 370/352 |
| 2005/0195774 A1* | 9/2005 | Chennikara et al. | | 370/338 |

FOREIGN PATENT DOCUMENTS

| | | |
|---|---|---|
| JP | 2003218935 | 7/2003 |
| WO | WO 03043241 A1 | 5/2003 |
| WO | WO 03030452 A2 | 10/2003 |

OTHER PUBLICATIONS

"Routing"; [online]; [retrieved Jun. 2004]; Retrieved from the Internet: <http://www.ubip.com/books/1861007353/chapter_7353_03.asp>.

"Traversal Using Relay NAT(TURN)"; [online]; J. Rosenberg;, R. Mahy, and C. Huitema; MIDCOM [retrieved Jun. 2004]; Retrieved from the Internet: <http://www.ietf.org/internet-drafts/draft-resenbert-midcom-turn-05.txt>.

The UDF Multicast Tunneling Protocol; [online]; Ross Finlayson; Network Working Group [retrieved Jun. 2004]; Retrieved from the Internet: <http://www.rnp.br/ietf/internet-drafts/draft-finlayson-umtp-09.txt>.

"multicast Tunnel—mTunnel" [online]; Peter Parnes; [retrieved Jun. 2004]; Retrieved from the Internet: <http://www.cdt.luth.se/~peppar/progs/mTunnel/>.

"mTunnel: a multicast tunneling system with a user based Quality-of-Service Model"; [online]; Peter Parnes, Kåre Synnes, and Dick Schefström; Luleå University of Technology; [retrieved Jun. 2004]; Retrieved from the Internet: <http://www.ctd.luth.se/~peppar/docs/index.html#1998>.

"Lightweight Application Level Multicast Tunneling using mTunnel"; [online]; Peter Parnes, Kåre Synnes and Dick Schefström; Luleå University of Technology; [retrieved Jun. 2004]; Retrieved from the Internet: <http://www.edt./uth.se/~peppar/docs/index.html#1997.

"Multicast Routing"; Microsoft Windows 2000 Server Documentation, 2000.

* cited by examiner

MULTICAST AND UNICAST MESSAGE RE-DIRECTION SYSTEM, METHOD, MESSAGE RE-DIRECTOR, AND NETWORK DEVICE

FIELD OF THE INVENTION

The invention relates to a multicast and unicast message re-direction system, method, message re-director, and network device.

BACKGROUND OF THE INVENTION

Some modern communications solutions are based on VoIP (Voice-over IP (Internet Protocol)) technology, which involves the transmission of calls over a data network based on the IP. The communication is in the form of packet data and there is no fixed connection as there would be in the case of switched networks. The communication can be text, voice, graphics or video. In order to simplify IP communication problems, standards have been developed and adopted in the industry. Examples of such standards are H.323 (Packet based communication systems) and SIP (Session Initiation Protocol). These standards are followed when designing new hardware and software. The SIP standard covers the technical requirements to set-up, modify and tear down multimedia sessions over the Internet. A multimedia communication session between two endpoints will be referred to as a call.

In distributed networks, telephone terminal sets use both unicast and multicast messages to communicate with each other. For a network containing a number of peer terminal sets each providing local call processing functionality, the peer terminal sets communicate with each other using messaging sequences. However, there are no efficient mechanisms for communication between the terminal sets. Multicast messaging provides an efficient mechanism for distributing information. However, for a system having peer terminal sets on more than one network segment a difficulty arises in multicast messaging between the peer terminal sets. This is particularly problematic when two peer terminal sets are on different networks that are protected by firewalls. In such a case, the two terminal sets may have the same private IP address and there is no simple mechanism for communicating with each other. Furthermore, communication between the two peer terminal sets might require that messages be routed through a router; however, many routers do not support multicast messaging. Some systems have been developed to provide a mechanism for tunneling multicast messages between routers; however, such systems are very expensive and are not well suited for distributed networks.

SUMMARY OF THE INVENTION

A plurality of local networks each have one or more network devices, such as terminal sets for example, and a message re-director. The message re-directors are adapted to communicate with each other across another network. The message re-directors are also adapted to convert multicast messages received locally from the terminal sets into unicast messages for transmission across the other network. The unicast messages are received by the other message re-directors. Each one of the other message re-directors then multicasts information received as part of the multicast messages received to the terminal sets within its local network.

In some embodiments of the invention, the message re-directors are also adapted to re-direct unicast messages from terminal sets. For this purpose, the network devices also maintain routing information locally to determine destination addresses of the message re-directors. They may be applicable in situations where the local networks are isolated from each other by firewalls and the terminal sets are assigned private IP addresses. The use of the message re-directors allows unicast messages to be transmitted across public networks, such as the Internet for example, between terminal sets from different local networks.

In some embodiments of the invention, the network devices have encryption capabilities and are adapted to encrypt/decrypt the unicast and/or multicast messages thereby distributing the load in providing encryption/decryption functionality among the network devices.

In accordance with a first broad aspect, the invention provides, at a message re-director, a method that involves receiving a received unicast message containing information and a message type identifier. The method also involves determining whether the information is to be forwarded as a unicast message or a multicast message using the message type identifier. If the message type identifier indicates that the information is to be forwarded as a multicast message, a multicast message containing the information is sent. If the message type identifier indicates that the information is to be forwarded as a unicast message, a first other unicast message containing the information is sent.

In some embodiments of the invention, the method also involves receiving an other multicast message containing other information; determining an address the other information is to be sent using routing information maintained at the message re-director; and sending a second other unicast message containing the other information to an other message re-director using the address.

In accordance with a second broad aspect, the invention provides, at a message re-director, a method that involves maintaining routing information associated with at one or more other network devices for use in sending unicast messages intended for the at least one other network device. A message containing an identifier of the network device and other routing information associated with the network device is sent to a message re-director for multicast/unicast conversion of the message. The other routing information is intended for the other network devices.

In accordance with a third broad aspect, the invention provides a message re-director having a memory adapted to store first instructions and an interface adapted to receive a received unicast message containing information and a message type identifier. The message re-director also has a processor adapted to, using the first instructions, determine whether the information is to be forwarded as a unicast message or a multicast message using the message type identifier. If the message type identifier indicates that the information is to be forwarded as a multicast message, the processor provides second instructions for sending a multicast message containing the information. If the message type identifier indicates that the information is to be forwarded as a unicast message, the processor provides third instructions for sending a first other unicast message containing the information.

In accordance with a fourth broad aspect, the invention provides a network device having a memory adapted to store first instructions and routing information associated with at least one other network device for use in sending unicast messages intended for the at least one other network device. The network device also has a processor adapted to use the first instructions for providing second instructions for sending a message containing an identifier of the network device and other routing information associated with the network device to a message re-director for multicast/unicast conversion of the message. The other routing information is intended for the at least one other network device.

In some embodiments of the invention, the message is a multicast message, the multicast message being sent to the message re-director for conversion into a unicast message.

In some embodiments of the invention, the message is a unicast message, the unicast message being sent to the message re-director for conversion into a multicast message.

In some embodiments of the invention, the network device is one of a terminal set, a packet based telephone, a video phone, a PC (Personal Computer), a PDA (Personal Digital Assistant), a soft phone, a wireless device, a wireless telephone, and a VoIP (Voice over Internet Protocol) telephone.

In accordance with a fifth broad aspect, the invention provides an article of manufacture having a computer usable medium having computer readable program code means embodied therein. The computer readable code means in the article of manufacture has computer readable code means for, responsive to receiving a received unicast message containing information and a message type identifier determining whether the information is to be forwarded as a unicast message or a multicast message using the message type identifier. The computer readable code means in the article of manufacture has computer readable code means for, if the message type identifier indicates that the information is to be forwarded as a multicast message providing first instructions for sending a multicast message containing the information. The computer readable code means in the article of manufacture also has computer readable code means for, if the message type identifier indicates that the information is to be forwarded as a unicast message providing second instructions for sending a first other unicast message containing the information.

In accordance with a sixth broad aspect, the invention provides an article of manufacture having a computer usable medium having computer readable program code means embodied therein. The computer readable code means in the article of manufacture has computer readable code means for maintaining routing information associated with one or more other network devices for use in sending unicast messages intended for the other network devices. The computer readable code means in the article of manufacture also has computer readable code means for providing first instructions for sending a message containing an identifier of the network device and other routing information associated with the network device to a message re-director for multicast/unicast conversion of the message. The other routing information is intended for the other network devices.

In accordance with a seventh broad aspect, the invention provides a system having a plurality of local area networks each having at least one network device adapted to process calls and send unicast messages and multicast messages each containing information, and each having a message re-director. Each message re-director is adapted to: i) maintain routing information; ii) responsive to receiving the unicast messages and the multicast messages, forward the information contained in the unicast messages and the multicast messages to at least one other message re-director as part of a unicast message containing a message type identifier using the routing information; and iii) responsive to receiving an other unicast message containing other information and an other message type identifier, determine whether the other information is to be forwarded as a unicast message or a multicast message using the other message type identifier. If the other message type identifier indicates that the other information is to be forwarded as a multicast message the message re-director is adapted to send a multicast message containing the information. If the other message type identifier indicates that the other information is to be forwarded as a unicast message the message re-director is adapted to send a first other unicast message containing the other information.

In accordance with an eighth broad aspect, the invention provides, at a network device, a method that involves encrypting information and sending a message containing the information to a message re-director for multicast/unicast conversion of the message. The information is intended for at least one other network device.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1A:
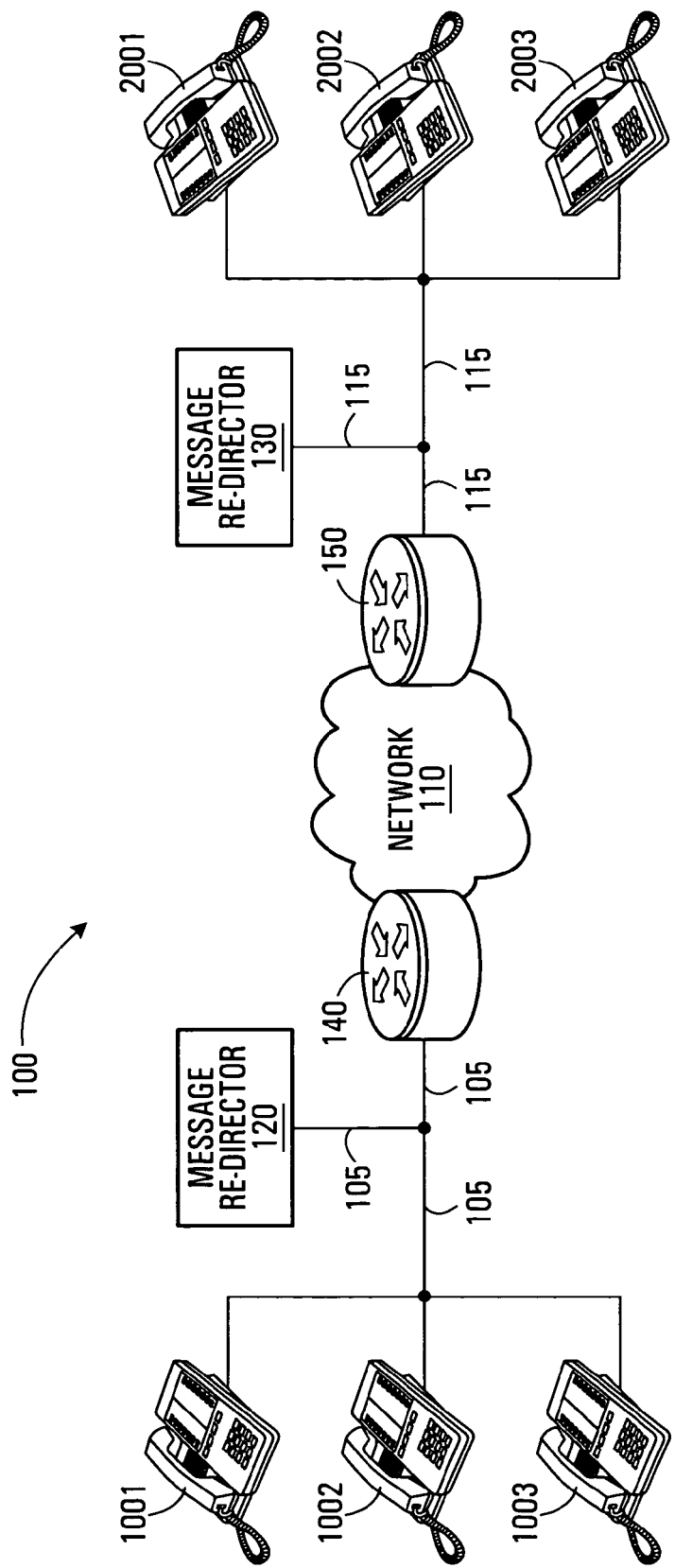
FIG. 1A is a block diagram of a system, in accordance with an embodiment of the invention.

In some embodiments of the invention, terminal sets such as VoIP (Voice over Internet Protocol) telephones are equipped with local call facilitating functionality and act as stand alone devices in providing the local call facilitating functionality. Example call facilitating functionalities include, but are not limited to, call processing functionalities such as call forwarding, call transfer, voice mail, call park and call park pickup, and paging, and other call related functionalities such as time synchronization, backup features, peer discovery, directory services, administrative services, and encryption. Some of these functionalities are described in U.S. Provisional Patent Application No. 60/441,481 entitled "DISTRIBUTED PEER-TO-PEER CALL TRANSFER SYSTEM, METHOD AND TELEPHONE TERMINALS" and filed Jan. 22, 2003; U.S. Provisional Patent Application No. 60/441,121 entitled "DISTRIBUTED PEER-TO-PEER CALL FORWARDING SYSTEM, METHOD AND TELEPHONE TERMINAL" and filed Jan. 21, 2003; U.S. Provisional Patent Application No. 60/434,813 entitled "DISTRIBUTED PEER-TO-PEER VOICE MAIL SYSTEM, METHOD AND TELEPHONE TERMINALS" and filed Dec. 20, 2002; U.S. Provisional Patent Application No. 60/473,877 entitled "DISTRIBUTED PEER-TO-PEER CALL PARK AND CALL PARK PICKUP SYSTEM, METHOD AND TELEPHONE TERMINALS" filed May 29, 2003; U.S. Provisional Patent Application No. 60/518,646 entitled "PEER-TO-PEER DISCOVERY SYSTEM, METHOD AND NETWORK DEVICES" filed Nov. 12, 2003; U.S. Provisional Patent Application No. 60/523,703 entitled "PEER BACK-UP IN A DISTRIBUTED PEER-TO-PEER NETWORK: SYSTEM, METHOD AND NETWORK DEVICES" filed Nov. 21, 2003; U.S. Provisional Patent Application No. 60/523,140 entitled "TIME SYNCHRONIZATION OF NETWORK DEVICES IN A NETWORK: SYSTEM, METHOD AND NETWORK DEVICE" filed Nov. 19, 2003; U.S. Provisional Patent Application No. 60/524,041 entitled "SYSTEM, METHOD AND NETWORK DEVICES FOR PAGING IN A NETWORK" filed Nov. 24, 2003; U.S. Patent Application No. 60/434,813 entitled "VOICE MAIL SYSTEM, METHOD AND NETWORK DEVICES" filed Dec. 22, 2003, U.S. patent application Ser. No. 10/760,530 entitled "CALL FORWARDING SYSTEMS, METHODS AND NETWORK DEVICES" filed Jan. 21, 2004; U.S. patent application Ser. No. 10/762,754 entitled "CALL TRANSFER SYSTEM, METHOD AND NETWORK DEVICES" filed Jan. 22, 2004; U.S. patent application Ser. No. 10/851,107 entitled "CALL PARK AND CALL PARK PICKUP SYSTEMS, METHODS AND NETWORK DEVICES" filed May 24, 2004, now U.S. Pat. No. 7,616,749; and U.S. patent application Ser. No. 10/952,905 entitled INFORMATION DISTRIBUTION SYSTEM, METHOD AND NETWORK DEVICES, filed Sep. 30, 2004, all of which are incorporated herein by reference. It is to be clearly understood, however, that embodiments of the invention are not limited by the type of call facilitating functionality being provided.

In a distributed peer-to-peer network containing a plurality of terminal sets the terminal sets transmit information among one another. This information might be used to provide the local call facilitating functionality. For VoIP telephones for example, information is transmitted between the VoIP telephones in the form of data packets with each data packet containing a header and a payload that contains the information that is to be transmitted. However, it is to be clearly understood that the invention is not limited to data packet implementations using data packets and that any suitable mechanism can be employed. Furthermore, various types of protocols can be employed for transmission. Example protocols include, but are not limited to, a SIP (Session Initiation Protocol) and a H.323 standard.

As discussed above, to provide local call facilitating functionality the terminal sets exchange information and use this information to provide the local call facilitating functionality. This information is for example, routing information on each of the terminal sets or any other information that might be used to provide call facilitating functionality. Such information is described in detail in the above United States Provisional Applications and the above United States Patent Applications. However, it is to be clearly understood that embodiments of the invention are not limited to the type of information being transmitted.

The messaging among the terminal sets is grouped into two types of messages: unicast messages and multicast messages. A unicast message is sent from a network device to another network device using a unicast address. A multicast message is sent from a network device using a multicast address and each network device that is configured to receive multicast messages at the multicast address receives the multicast message. For the IP protocol, IP addresses are in the form x.x.x.x where x is an integer from 0 to 255. Some IP addresses are reserved for multicast messaging and some IP addresses are reserved for unicast messages. For example, IP addresses in the form 192.x.x.x and 193.x.x.x are used for unicast messaging whereas IP addresses in the form 239.x.x.x are used for multicast messaging. Furthermore, a number of IP addresses referred to as private addresses are reserved for use in private networks and are not publicly accessible. For example, an IP address in the form 192.x.x.x is a private address in addition to being a unicast address. A number of IP addresses referred to as public addresses are reserved for use in public networks and are publicly accessible. For example, an IP address in the form 193.x.x.x is a public address in addition to being a unicast address.

In multicast messaging each of one or more terminal sets are configured to listen on a multicast address. The terminal sets are configured by a network administrator for example. To send a multicast message, a terminal set sends the message to the multicast address. Each terminal set configured to listen on the multicast address receives the multicast message.

In a distributed system containing a plurality of peer terminal sets, a problem arises when two terminal sets are on two different networks that are separated by routers or firewalls for example. Some routers do not support multicast messaging between the routers. Furthermore, when two terminal sets are separated by routers there is the possibility of the two network devices having the same private IP address. In the case where IP addresses are no longer unique, problems can arise in transmitting information between terminal sets in separate networks. Methods used to overcome these and other problems are described below. To begin, a first method will now be described with reference to FIGS. 1A and 4A for a system in which terminal sets on different networks are separated by routers.

Referring to FIG. 1A, shown is a system, generally indicated by 100, in accordance with an embodiment of the invention. The system 100 has routers 140, 150 that have access to a network 110. Terminal sets (TS) 1001, 1002, 1003 and a message re-director 120 have access to the network 110 through the router 140 by way of logical links 105. Similarly, terminal sets 2001, 2002, 2003 and a message re-director 130 have access to the network 110 through the router 150 by way of logical links 115. In FIG. 1A, each one of terminal sets 1001, 1002, 1003, 2001, 2002, 2003 is a VoIP (Voice over Internet Protocol) telephone. However, the invention is not limited to the terminal sets 1001, 1002, 1003, 2001, 2002, 2003 being VoIP telephones. More generally, each one of terminal sets 1001, 1002, 1003, 2001, 2002, 2003 is one of a VoIP telephone, a packet based telephone, a video phone, a PC (Personal Computer), a PDA (Personal Digital Assistant), a soft phone, a wireless device, and a wireless telephone.

In FIG. 1A, there are two message re-directors 120, 130 providing message re-direction functionality for terminal sets 1001, 1002, 1003, 2001, 2002, 2003 and gateway devices 1004, 2004 respectively. More generally, there are two or more message re-directors each providing message re-directing functionality for a respective plurality of terminal sets and/or other network devices such as gateway devices.

Each one of the terminal sets 1001, 1002, 1003, 2001, 2002, 2003 and the message re-directors 130, 140 maintains routing information locally for sending messages to other ones of the terminal sets 1001, 1002, 1003, 2001, 2002, 2003. Furthermore, in some embodiments of the invention, the routing information is maintained to allow the terminal sets 1001, 1002, 1003, 2001, 2002, 2003 to provide call facilitating functionality locally such as the above described call facilitating functionalities.

Referring back to FIG. 1A, the terminal sets 1001, 1002, 1003, 2001, 2002, 2003 send messages among one another to, for example, provide any one or more of the above call facilitating functionalities, and/or to support calls between each other and to other terminal sets (not shown) that might be external the network 100. The types of messages that are sent are unicast messages and multicast messages. However, for the system 100 of FIG. 1A, a multicast message directed to a multicast address cannot be transmitted across the network 110 between routers 140, 150. A method of transmitting multicast messages according to an embodiment of the invention will now described with reference to FIGS. 1A and 4A.

Figure 4A:
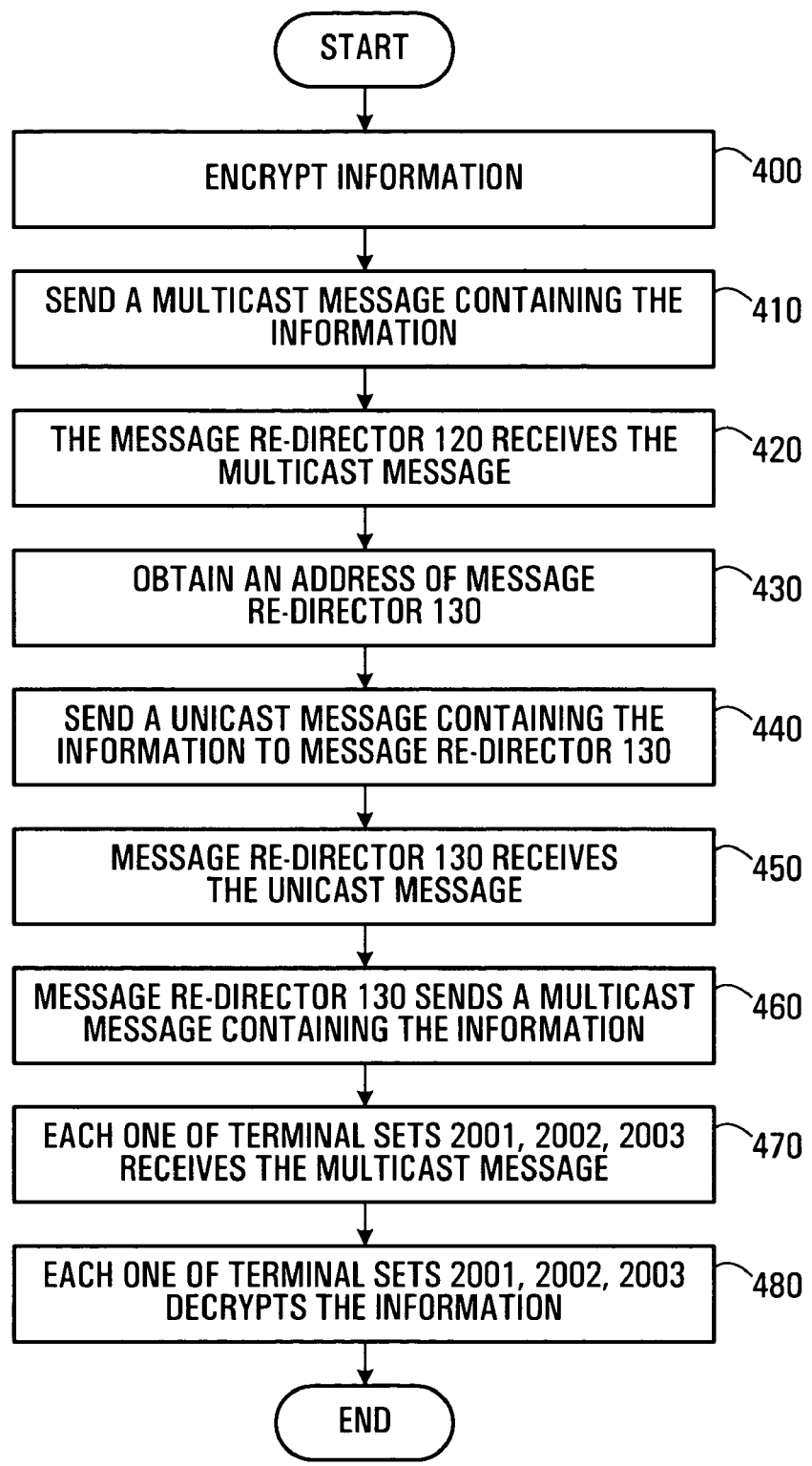
FIG. 4A is a flow chart of a method of distributing information among the terminal sets of FIG. 1A using multicast messaging, the method being implemented in the context of an example messaging sequence.

Referring to FIG. 4A shown is a flow chart of a method of distributing information among the terminal sets 1001, 1002, 1003, 2001, 2002, 2003 of FIG. 1A using multicast messaging, the method being illustrated by way of an example messaging sequence. In the example of FIG. 4A, it is assumed that information at the terminal set 1001 is to be distributed to terminal sets 2001, 2002, 2003. It is to be clearly understood that in this example and other examples below the information is also distributed to terminal sets 1002, 1003; however, for purposes of showing how information can be transmitted across the network 110, only the distribution of the information to terminal sets 2001, 2002, 2003 will be described.

In this example the terminal sets 1001, 1002, 1003, 2001, 2002, 2003 and the message re-directors 120, 130 are configured to listen on a local multicast address. At terminal set 1001, information that is to be distributed is encrypted (step 400) and at step 410 a multicast message containing the information is sent to the local multicast address. The message re-director 120 receives the multicast message (step 420) and obtains an address of the message re-director 130 using routing information maintained at message re-director 120 (step 430). The type of routing information maintained will be described in detail below with reference to FIG. 2A. The message re-director 120 then sends a unicast message containing the information to message re-director 130 (step 440).

At step 450, the message re-director 130 receives the unicast message. At step 460, the message re-director 130 sends a multicast message containing the information to the local multicast address. At step 470, each one of terminal sets 2001, 2002, 2003 listens on the local multicast address, receives the multicast message, and decrypts the information (step 480).

In the example of FIG. 4A, at each one of message re-directors 120, 130 any information received as part of a unicast message is transmitted as part of a multicast message and any information that is received as part of a multicast message is transmitted as part of a unicast message. However, as will be described below in some embodiments of the invention a message re-director can also receive information as part of a unicast message and transmit the information as part of another unicast message.

It to be clearly understood that the invention is not limited to the particular example of FIG. 4A. For example, in another implementation, the encryption step 400 is performed by the message re-director 120 and the decryption step 480 is performed by the message re-director 130. In yet another implementation, there is no encryption and no decryption. Encrypting the information at terminal set 1001 as opposed to message re-director 120 and decrypting the information at terminal sets 2001, 2002, 2003 as opposed to message re-director 130 provides relief on the processing load at the message re-directors 120, 130 which would otherwise have to provide encryption/decryption functionality for all of the terminal sets 1001, 1002, 1003, 2001, 2002, 2003. This is of particular importance because encryption and description can be very CPU (Central Processing Unit) resource intensive, potentially causing bottlenecks when too many terminal sets are on a network. By having encryption/decryption functionality at the terminal set each terminal set processes only information destined to the terminal sets as opposed to information from a large number terminal sets. As such, the encryption/decryption functionality can be implemented without the requirement of expensive processing equipment.

Figure 9A:
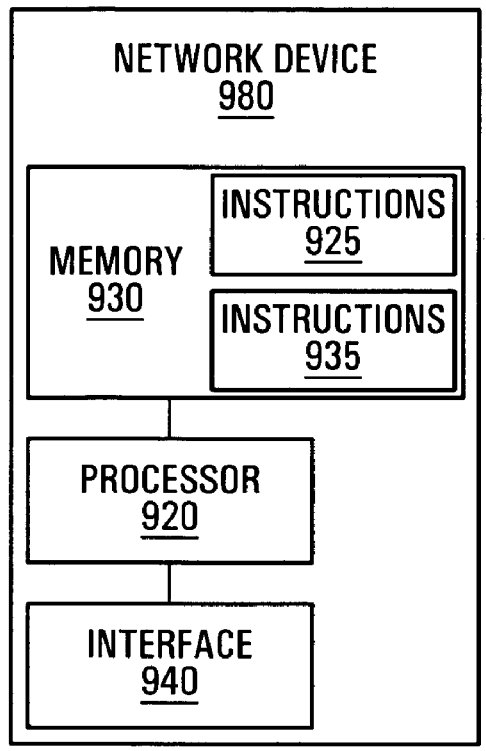
FIG. 9A is a block diagram of a network device, in accordance with another embodiment of the invention.

Referring to FIG. 9A, shown is a block diagram of a network device generally indicated by 980, in accordance with another embodiment of the invention. The network device 980 corresponds to any one of terminal set 1001, 1002, 1003, 2001, 2002, 2003, or as will be described below any network device such as a gateway device for example, and is used to implement the method of FIG. 4A. The network device 980 has a processor 920, an interface 940, and a memory 930. The memory 930 stores instructions 925 for use by the processor 920 for providing instructions to the interface 940 in sending messages. The memory 930 also stores instructions 935 for use by the processor 920 for encrypting information and decrypting information that is to be sent in the messages.

In some embodiments of the invention, the instructions 925 also provide any one or more of the above summarized call facilitating functionalities.

Embodiments of the invention are not limited to the network device 980 being adapted for use in implementing the method of FIG. 4A. More generally, the instructions 925 are used by the processor 920 to provide instructions for implementing any one or more of the method of FIG. 4A and the methods described below. A particular layout is shown in FIG. 9A. However, in preferred embodiments, any VoIP phone can be used to implement one or more of the described methods simply by adding suitable software to the network device.

Figure 9B:
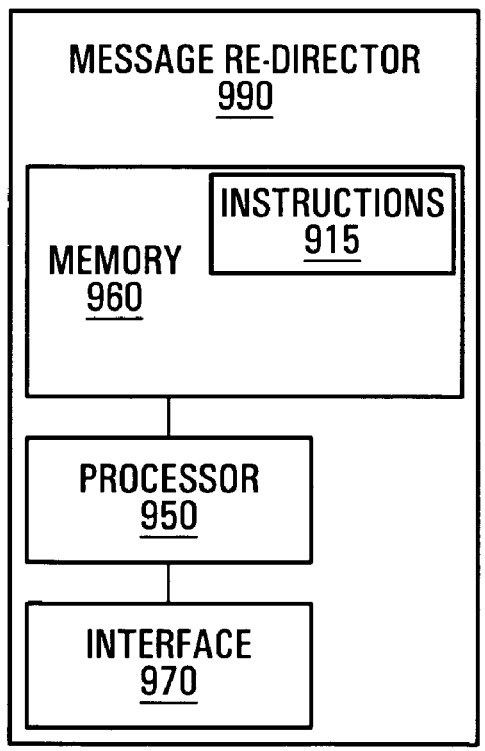
FIG. 9B is a block diagram of a message re-director, in accordance with another embodiment of the invention.

Referring to FIG. 9B, shown is a block diagram of a message re-director generally indicated by 990, in accordance with another embodiment of the invention. The message re-director 990 is used for implementing the method of FIG. 4A.

The message re-director 990 corresponds to any one of message re-directors 120, 130 of FIG. 1A and has a processor 950, an interface 970, and a memory 960. The memory 960 stores instructions 915 for use by the processor 950 in providing instructions for re-directing messages.

Embodiments of the invention are not limited to the message re-director 990 being adapted for use in implementing the method of FIG. 4A. More generally, the instructions 915 are used by the processor 950 to provide instructions for implementing any one or more of the methods of FIG. 4A and the methods described below.

Figure 2A:
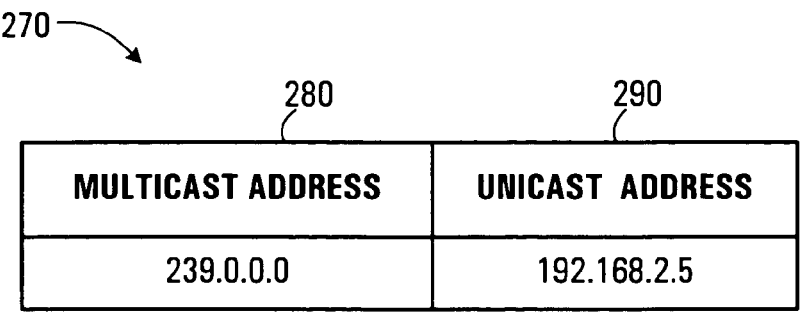
FIG. 2A is a table containing routing information used to distribute information among the terminal sets of FIG. 1A.

As discussed above, routing information is maintained for purposes of sending messages among the terminal sets 1001, 1002, 1003, 2001, 2002, 2003. An example of the type of routing information that might be used in embodiments of the invention is shown in FIG. 2A. In FIG. 2A there is a table generally indicated by 270. The Table 270 is used by the message re-director 120 in determining which other message re-director is to be sent information received as a multicast message. The Table 270 has a column 280 that identifies multicast addresses (only one shown for clarity). The Table 270 also has a column 290 that identifies, for each multicast address, associated unicast address(es). In some embodiments of the invention, the Table 270 is populated for example during configuration by an administrator. Furthermore, with reference to FIG. 1A there are only two message re-directors 120, 130 and the message re-directors 120, 130 need to send information only to one other message re-director. As such, for the multicast address 239.0.0.0 there is only one unicast address 192.168.2.5 corresponding to an IP address of message re-director 130; however, it is to be clearly understood that more generally Table 270 contains one or more entries. Regarding messages re-director 130, this message re-director also maintains a table similar to Table 270; however, in this case the table has a unicast address of message re-director 120 as an entry in column 290.

Figure 3A:
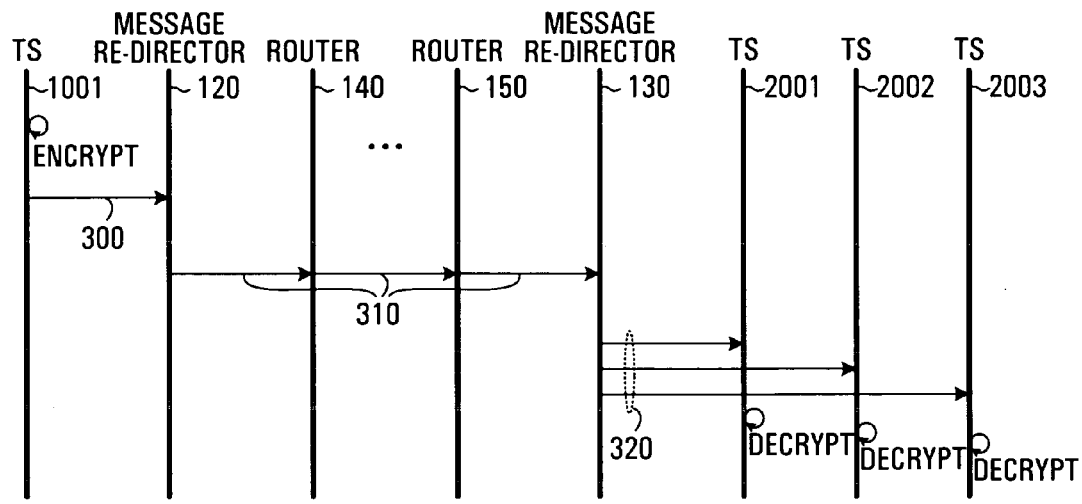
FIG. 3A is a signal flow diagram of messaging between terminal sets of FIG. 1A.

A more detailed implementation of the method of FIG. 4A will now described with reference to FIGS. 1A, 2A, 3A, and 3B to show how the routing information of Table 270 of FIG. 2A is used for distributing information. In FIG. 3A, shown is a signal flow diagram of messaging between terminal sets, for an example implementation. In the example implementation, the terminal set 1001 is to multicast information to terminal sets 2001, 2002, 2003. In particular, in FIG. 3A the terminal set 1001 encrypts the information and sends a multicast message 300 containing information using the multicast address 139.0.0.0 The message re-director 120 is configured to listen on the multicast address and receives the multicast message 300. With reference to Table 270 of FIG. 2A, the message re-director 120 is configured to re-direct received multicast messages as unicast messages to the message re-director 130 using the unicast address 192.168.2.5 of the message re-director 130 found in column 290 of Table 270. Responsive to receiving the multicast message 300, the message re-director 120 sends a unicast message 310 to the message re-director 130 through routers 140, 150 using the unicast address of message re-director 140. Responsive to receiving the message 310, the message re-director 130 sends a multicast message 320 containing the information to terminal sets 2001, 2002, 2003 using the multicast address. Responsive to receiving the multicast message 320, each terminal set 2001, 2002, 2003 decrypts the information.

Figure 2B:
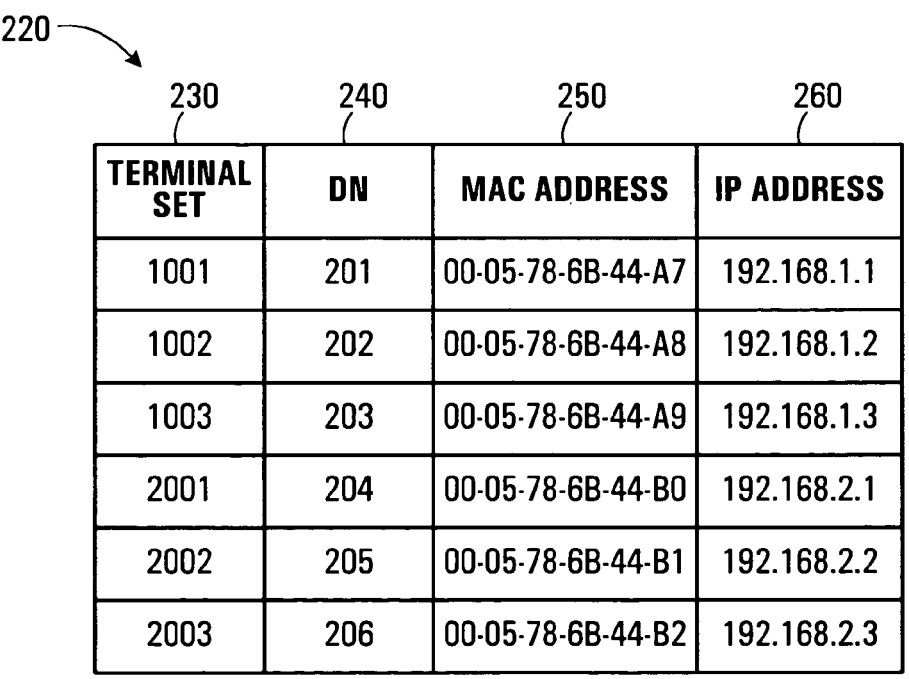
FIG. 2B is another table containing routing information used to distribute information among terminal sets of FIG. 1A.

To send unicast messages between each other, the terminal sets 1001, 1002, 1003, 2001, 2002, 2003 each maintain a table which will now be described with reference to FIG. 2B. In FIG. 2B, there is a table generally indicated by 220, which contains routing information. In particular, a column 230 identifies the terminal sets 1001, 1002, 1003, 2001, 2002, 2003. In a column 240, shown are DNs (Directory Numbers) for the terminal sets 1001, 1002, 1003, 2001, 2002, 2003. MAC (Media Access Control) addresses of the terminal sets 1001, 1002, 1003, 2001, 2002, 2003 are shown in a column 250, and IP addresses of the terminal sets 1001, 1002, 1003, 2001, 2002, 2003 are shown in a column 260. A method of populating Table 220 at each of terminal sets 1001, 1002, 1003, 2001, 2002, 2003 will be described below with reference to FIG. 3B.

In the example implementation, for terminal set 1001 to send a unicast message to the terminal set 2002 for example, the terminal set 1001 looks-up its version of Table 220 to obtain the IP address of terminal set 2002, and sends the message directly to terminal set 2002 through routers 140, 150 bypassing message redirectors 120, 130. Such a method of transmitting unicast messages will now described with reference to FIGS. 1A and 4B.

Figure 4B:
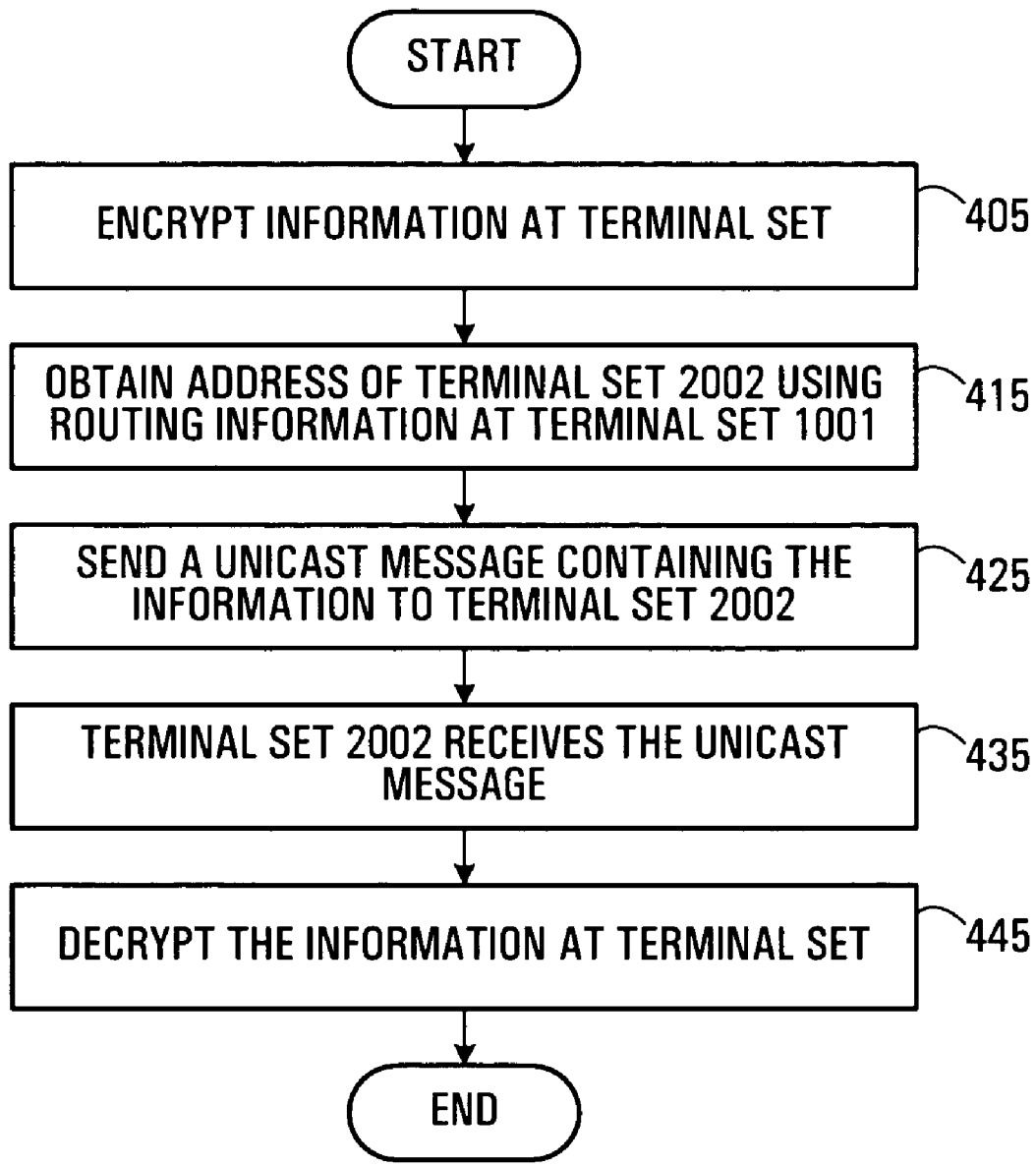
FIG. 4B is a flow chart of a method of sending information from a terminal set of FIG. 1A to another terminal set of FIG. 1A using unicast messaging, the method being implemented in the context of an example messaging sequence.

Referring to FIG. 4B shown is a flow chart of a method of sending information from terminal set 1001 of FIG. 1A to terminal set 2002 of FIG. 1A using unicast messaging, the method being illustrated by way of an example messaging sequence. At terminal set 1001, the information is encrypted (step 405) and at step 415 an address of terminal set 2002 is obtained from routing information maintained at terminal set 1001. This routing information is for example an IP address of terminal set 2002 shown in Table 220 of FIG. 2B. At step 425, the terminal set 1001 sends a unicast message containing the information to terminal set 2002 through routers 140, 150. At step 435, the terminal set 2002 receives the unicast message and decrypts the information (step 445).

As discussed above, each one of the terminal sets 1001, 1002, 1003, 2001, 2002, 2003 makes use of routing information in its version of Table 220 of FIG. 2B to send unicast messages. To populate the Table 220 of FIG. 2B, the terminal sets 1001, 1002, 1003, 2001, 2002, 2003 exchange messages containing routing information and update their respective table. For example, when the terminal set 1001 becomes available it determines its DN. An example of a method by which DNs are obtained is described in U.S. Provisional Patent Application No. 60/518,646 entitled "PEER-TO-PEER DISCOVERY SYSTEM, METHOD AND NETWORK DEVICES" filed Nov. 12, 2003. How the terminal set 1001 sends its routing information to the terminal sets 2001, 2002, 2003 across the network 110 will now be described with reference to FIGS. 1A, 2A, and 3B.

Figure 3B:
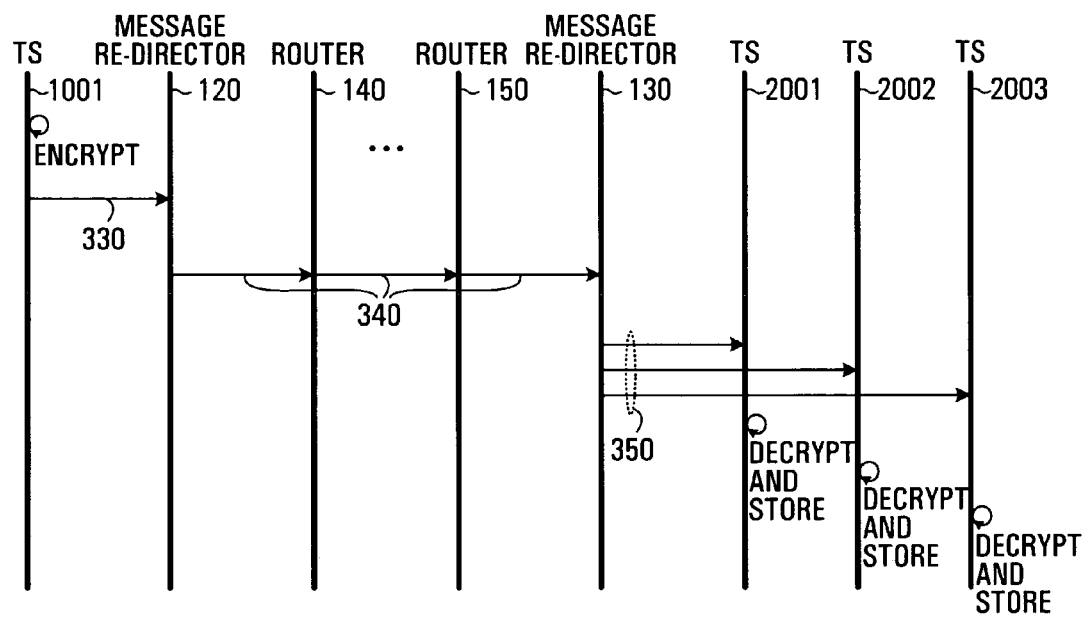
FIG. 3B is another signal flow diagram of messaging between terminal sets of FIG. 1A.

In FIG. 3B, the terminal set 1001 encrypts the routing information and sends a multicast message 330 containing the routing information as part of a payload of message 300. The information is to be identified by terminal sets 2001, 2002, 2003 as routing information for Table 220 of FIG. 2, and for this purpose the information is located in a specific location in the payload and a message type indicator is transmitted with the information, for example. In the example, the routing information includes a DN, a MAC address, and an IP address of terminal set 1001. The message re-director 120 receives the multicast message 330 and sends a message 340 containing the routing information to the message re-director 130 through the routers 140, 150 using the unicast address of message re-director 130 found in Table 270 of FIG. 2A. Responsive to receiving the unicast message 340, the message re-director 130 sends a multicast message 350 containing the routing information to the terminal sets 2001, 2002, 2003 using the multicast address. Responsive to receiving the message 350, each one of network devices 2001, 2002, 2003 identifies the information as information to be stored using the message type indicator, decrypts the information, and stores the routing information in its version of Table 220.

Figure 1B:
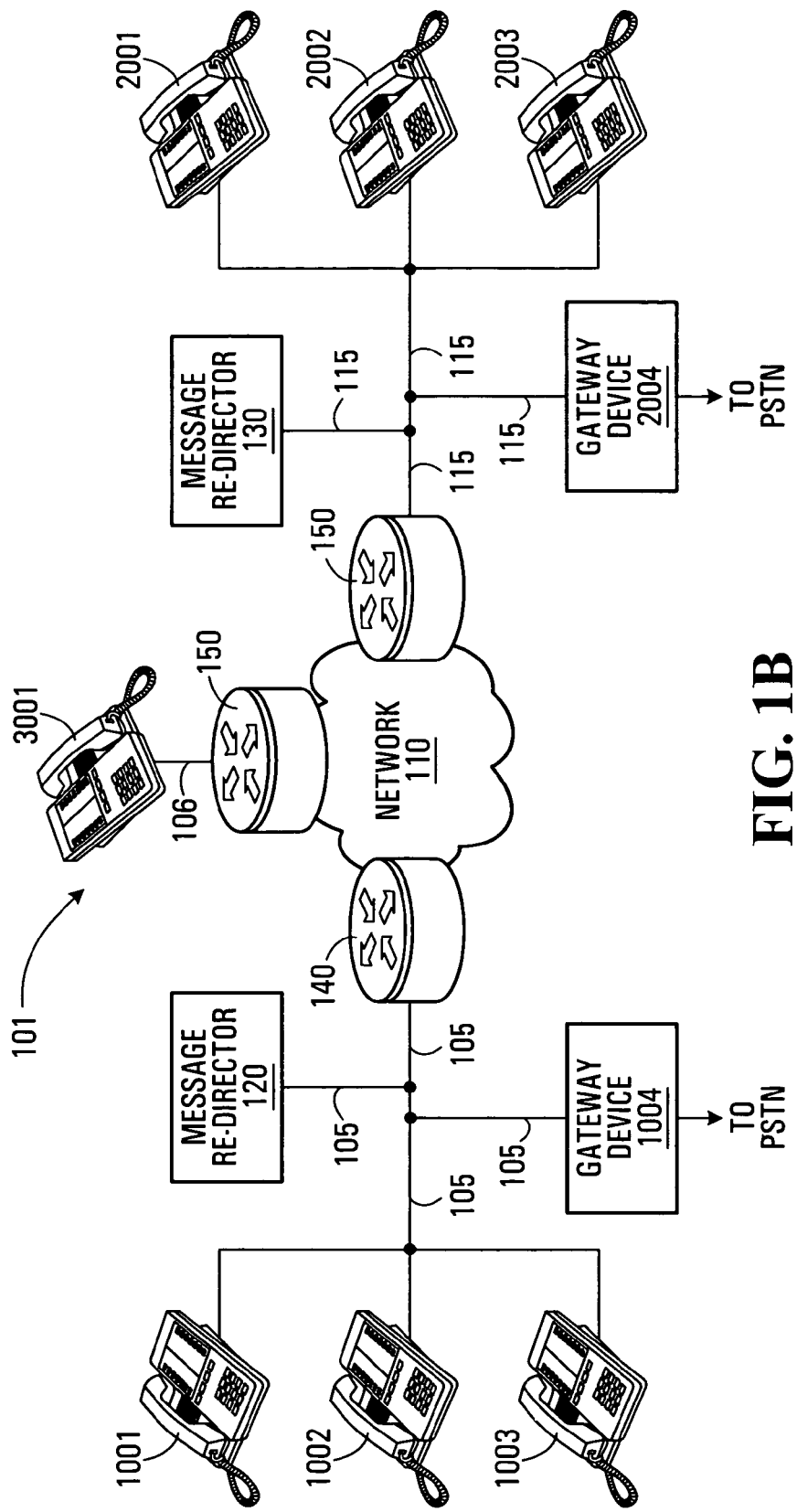
FIG. 1B is a block diagram of a system, in accordance with another embodiment of the invention.

In FIG. 1A, terminal sets 1001, 1002, 1003, 2001, 2002, 2003 are interconnected through network 110 over which communication is performed using IP protocols. Each terminal set can also access a PSTN (Public Switched Telephone Network) through a gateway device such as a TTI (Thin Trunk Interface) for example. Such gateway devices are not shown in FIG. 1A for purposes of clarity. In FIG. 1B, shown is a system generally indicated by 101, in accordance with another embodiment of the invention. The system 101 is similar to the system 100 of FIG. 1A, except that there are two gateway devices 1004, 2004. Gateway devices 1004, 2004 provide access to the PSTN (not shown) for the terminal sets 1001, 1002, 1003, 2001, 2002, 2003. Furthermore, the gateway devices 1004, 2004 are equipped with the same information distribution functionality as that of terminal sets 1001, 1002, 1003, 2001, 2002, 2003. As described in the above incorporated U.S. provisional patent applications and U.S. patent applications, the gateway devices are capable of assisting in the above described call facilitating functionalities.

Figure 9C:
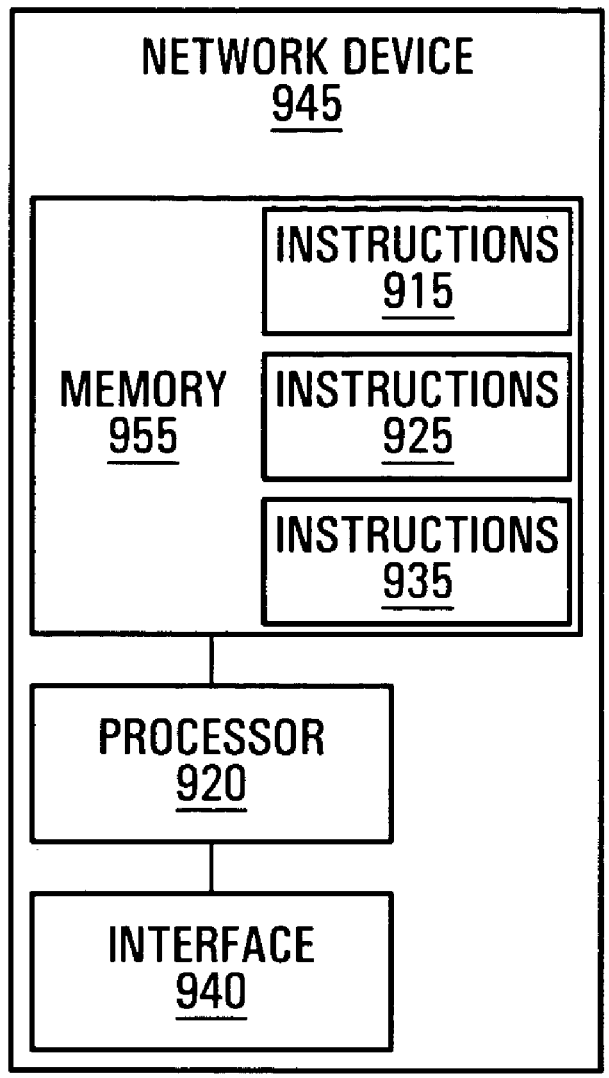
FIG. 9C is a block diagram of a network device, in accordance with yet another embodiment of the invention.

The system 101 also has a terminal set 3001 connected to a router 151 through a link 106. In this implementation, the terminal set is connected remotely through link 106. This connection represented by the link 106 can be any suitable connection such as a landline connections or a combination of landline and wireless connections for example. The terminal set 3001 is not only equipped with the same information distribution capabilities as terminal sets 1001, 1002, 1003, 2001, 2002, 2003, but is also equipped with the functionality of message re-directors 120, 130. With reference to FIG. 9C, shown is a network device 945. The network device 945 is for example a terminal set such as terminal set 3001 for example. The network device 945 is similar to terminal sets 1001, 1002, 1003, 2001, 2002, 2003 as represented by network device 980 of FIG. 9C except that a memory 955 of the network device 945 which contains instructions 915 in addition to the instructions 925, 935 of memory 930 of network device 980. As discussed above, with reference to FIG. 9B, the instruction 925 are used for providing instructions in re-directing messages.

Except for the message re-direction functionality, the network devices 945, 980 have the same functionality. For any message requiring to be sent to a message re-director each one of the network devices 945, 980 is capable of sending the message containing the information to the message re-director for multicast/unicast conversion of the message. For example, in one case the network device 980 sends a multicast message to a message re-director for conversion into a unicast message to be transmitted across a network. For the network device 945 information that is to be multicast is sent across a network in the form of a unicast message across a network to another message re-director for conversion into a multicast message.

It can be seen that functionality of message re-directors 120, 130 can be implemented at a terminal set. More generally, the functionality of message re-directors is implemented in any one or more of terminal sets 1001, 1002, 1003, 2001, 2002, 2003, gateway devices 1004, 2004, and routers 120, 130.

The above methods of messaging have been described in the context of the systems 100, 101 of FIGS. 1A and 1B, which have routers 140, 150 and routers 140, 150, 151, respectively, as edge devices of the network 110. In these systems 100, 101, no two terminal sets of terminal sets 1001, 1002, 1003, 2001, 2002, 2003 has the same private IP address. Other methods of distributing information among the terminal sets 1001, 1002, 1003, 2001, 2002, 2003 will now described for a system in which two terminal sets can have identical private IP addresses.

Figure 5:
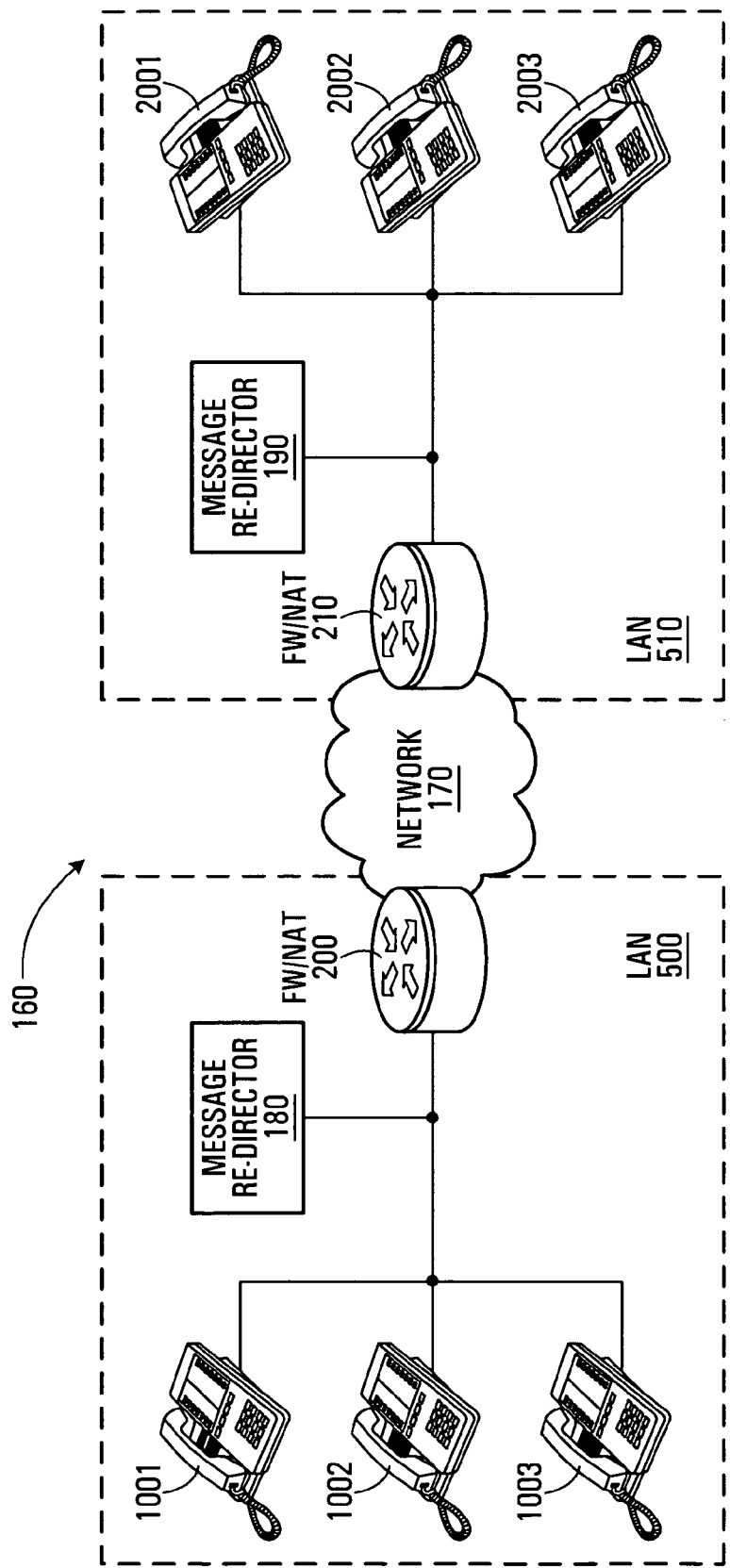
FIG. 5 is a block diagram of a system, in accordance with another embodiment of the invention.
Figure 6A:
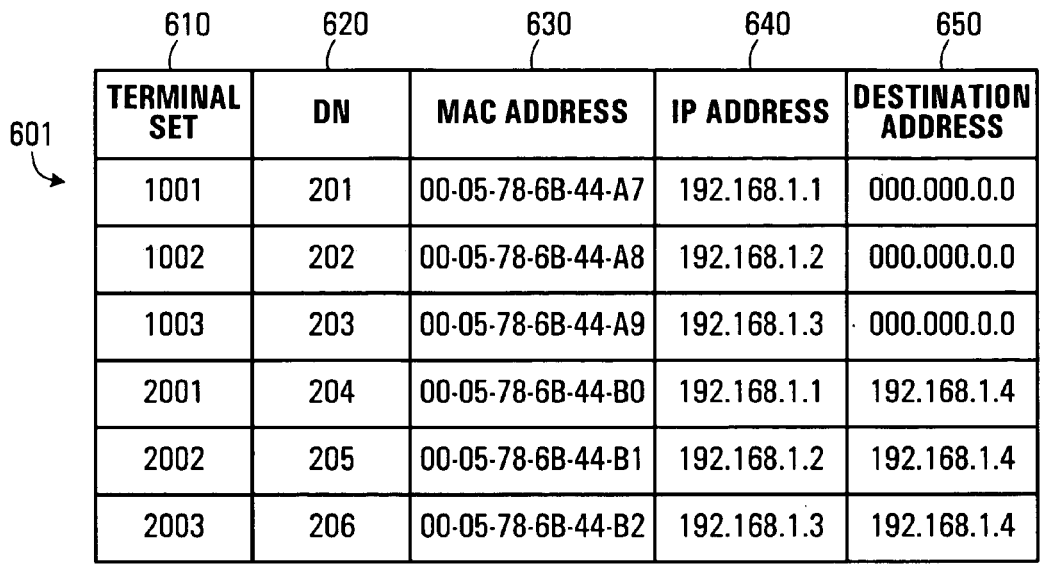
FIG. 6A is table containing routing information used by terminal sets of FIG. 5 in distributing information.
Figure 6B:
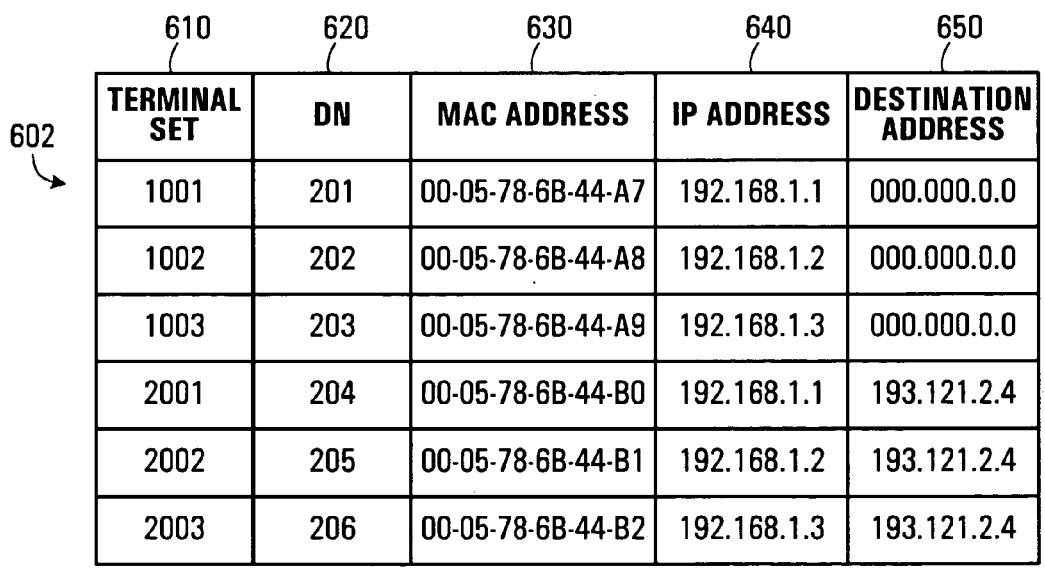
FIG. 6B is a table containing routing information used by a message re-director of FIG. 5 in distributing information.
Figure 6C:
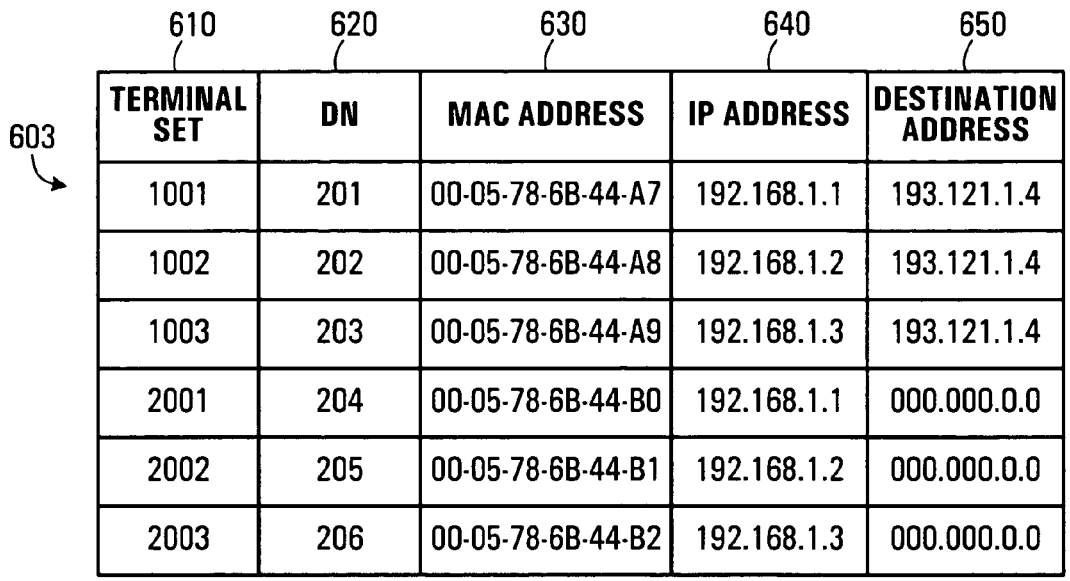
FIG. 6C is a table containing routing information used by another message re-director of FIG. 5 in distributing information.
Figure 6D:
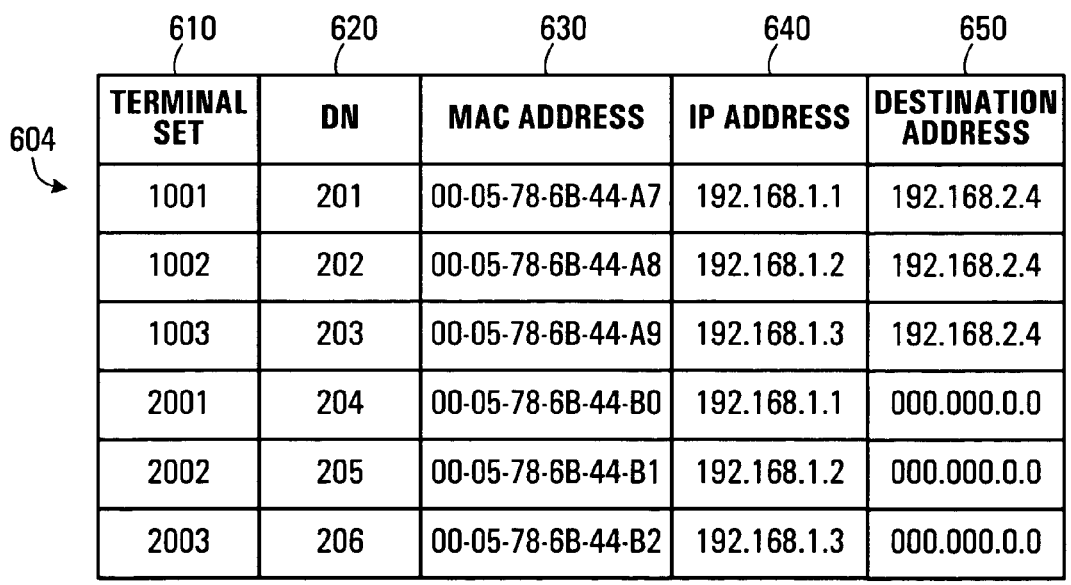
FIG. 6D is table containing routing information used by terminal sets of FIG. 5 in distributing information.

Referring to FIG. 5, shown is a system, generally indicated by 160, in accordance with another embodiment of the invention. The system 160 is similar to the system 100 of FIG. 1A except that the message re-directors 120 and 130 have been replaced by message re-directors 180 and 190, respectively, and routers 140 and 150 have been replaced by FW/NATs (Firewall/Network Adaptation Translations) 200 and 210, respectively. Furthermore, messages are transmitted across a network 170, which is a public network such as the Internet for example. With network 170 being a public network, unicast messages cannot simply be sent directly from one terminal set to another across the network 170 using private IP addresses. In the example of FIG. 5, the terminal sets 1001, 1002, 1003 and the message re-director 180 are in a LAN (Local Area Network) 500, and the terminal sets 2001, 2002, 2003 and the message re-director 190 are in a LAN 510. Within LAN 500, the terminal sets 1001, 1002, 1003 and the message re-director 180 have private IP addresses that are unique. Similarly, within LAN 510, the terminal sets 2001, 2002, 2003 and the message re-director 190 have private IP addresses that are unique. However, since the terminal sets 1001, 1002, 1003, 2001, 2002, 2003 are behind FW/NATs 200 and 210 the private IP addresses of two terminal sets, in different LANs 500, 510 are not necessarily unique. Methods of distributing information across the network 170 will now be described with reference to FIGS. 5 and 8A.

Figure 8A:
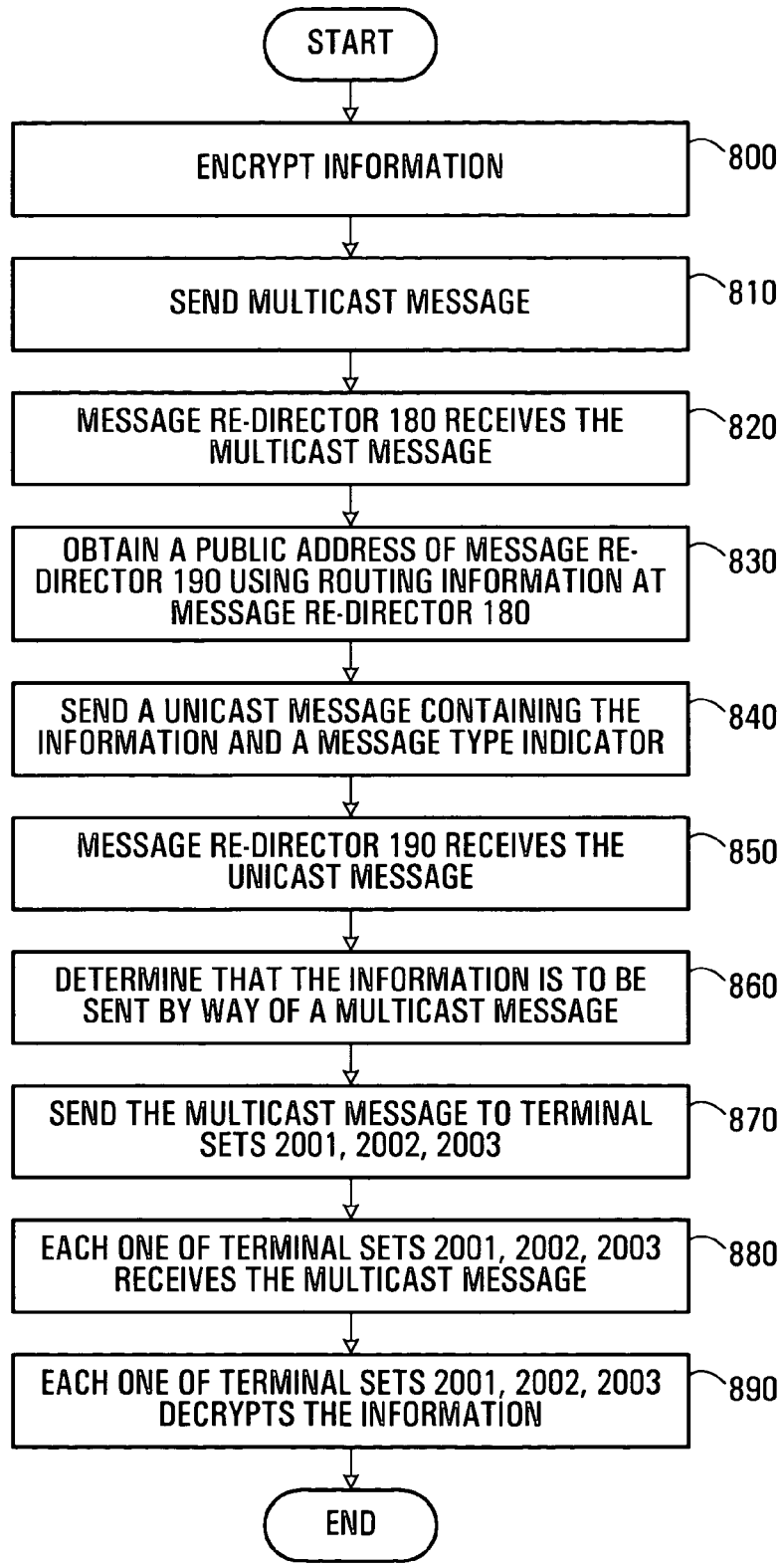
FIG. 8A is a flow chart of a method of distributing information among terminal sets of FIG. 5 using multicast messaging.

Referring to FIG. 8A shown is a flow chart of a method of distributing information among the terminal sets 1001, 1002, 1003, 2001, 2002, 2003 of FIG. 5 using multicast messaging. In particular, in the method of FIG. 8A information at terminal set 1001 is to be distributed to terminal sets 2001, 2002, 2003 across the network 170 using multicast messages. At terminal set 1001, the information is encrypted (step 800) and at step 810 a multicast message containing the information is sent to a local multicast address. The message re-director 180 is configured to listen on the local multicast address, receives the multicast message (step 820), and obtains a public address of the message re-director 190 using routing information maintained at message re-director 180 (step 830). The type of routing information maintained will be described in detail below with reference to FIGS. 6A, 6B, 6C, and 6D. The message re-director 180 then sends a unicast message containing the information and a message type indicator for indicating to message re-director 190 that the unicast message is to be treated as a multicast message (step 840). At step 850, the message re-director 190 receives the unicast message and determines that the information is to be sent by way of a multicast message using the message type indicator step 860. At step 870, the message re-director 190 sends the multicast message to the local multicast address. Each one of terminal sets 2001, 2002, 2003 is configured to listen in on the multicast address and, at step 880, each one of terminal sets 2001, 2002, 2003 receives the multicast message, and decrypts the information (step 890).

It to be clearly understood that the invention is not limited to the method of FIG. 8A. For example, in another implementation, the encryption step 800 is performed by the message re-director 180 and the decryption step 890 is performed by the message re-director 190. In yet another implementation, there is no encryption and no decryption.

As discussed above the method of FIG. 8A makes use of routing information maintained at the terminal sets 1001, 1002, 1003, 2001, 2002, 2003 and FW/NATs 200, 210 to distribute information. The type of routing information that might be used for this purpose will now be described with reference to FIGS. 6A, 6B, 6C, and 6D.

Referring to FIGS. 6A to 6D, shown are tables generally indicated by 601, 602, 603, and 604, and used by the terminal sets 1001, 1002, 1003, 2001, 2002, 2003 and message re-directors 180, 190 in distributing information among the terminal sets 1001, 1002, 1003, 2001, 2002, 2003. In particular, an illustrative example will now be described in which each one of terminal sets 1001, 1002, 1003 maintain its version of Table 601, message re-director 180 maintains Table 602, message re-director 190 maintains Table 603, and each one of terminal sets 2001, 2002, 2003 maintains its version of Table 604. Each Table 601, 602, 603, 604 has a column 610 that identifies the terminal sets 1001, 1002, 1003, 2001, 2002, 2003; a column 620 that identifies DNs of terminal sets 1001, 1002, 1003, 2001, 2002, 2003; a column 630 that identifies MAC addresses of terminal sets 1001, 1002, 1003, 2001, 2002, 2003; a column 640 identifies private IP addresses of the terminal sets 1001, 1002, 1003, 2001, 2002, 2003; and a column 650 identifies destination addresses associated with the terminal sets 1001, 1002, 1003, 2001, 2002, 2003. The MAC addresses of column 630 uniquely identify the terminal sets 1001, 1002, 1003, 2001, 2002, 2003; however, the private IP addresses of column 640 are not unique to the terminal sets 1001, 1002, 1003, 2001, 2002, 2003. In the example, terminal sets 1001, 1002, 1003 have private IP addresses identical to those of terminal sets 2001, 2002, 2003, respectively. A method by which the Tables 601, 602, 603, 604 are populated will be described below with reference to FIG. 7B.

Furthermore, entries in columns 610, 620, 630, and 640 are identical from one table to another; however, entries in column 650 differ from one table to another. For example, in Table 601, the destination addresses of terminal sets 1001, 1002, 1003 within LAN 500 are 000.000.0.0, which as will be described further below indicates that messages sent by any one of terminal sets 1001, 1002, 1003 to any other one of terminal sets 1001, 1002, 1003 are to be sent locally within LAN 500 and do not need to go through the message re-director 180. In Table 601 the destination address associated with each of terminal sets 2001, 2002, 2003 of LAN 510 is 192.168.1.4 and corresponds to a private IP address of the message re-director 180 of LAN 500. This destination address indicates to any one of terminal sets 1001, 1002, 1003 looking up its version of Table 601 that any message destined to any one of the terminal sets 2001, 2002, 2003 is to be directed to the message re-director 180.

The Table 602 is maintained and used by the message re-director 180. In Table 602 the destination address of each of terminal sets 1001, 1002, 1003 within LAN 500 is 000.000.0.0, and indicates that messages received by the message re-director 180 and destined to terminal sets 1001, 1002, 1003 are to be forwarded locally within LAN 500. In Table 602, the destination address associated with each of terminal sets 2001, 2002, 2003 of LAN 510 is 193.121.2.4 and corresponds to a public IP address of message re-director 190 of LAN 510. This destination address indicates to the message re-director 180 that messages received and destined for terminal sets 2001, 2002, 2003 are to be sent to message re-director 190.

The Table 603 is used by message re-director 190. In Table 603 the destination address associated with each of terminal sets 1001, 1002, 1003 of LAN 500 is 193.121.1.4 and corresponds to a public IP address of the message re-director 180 of LAN 500. This non-zero address indicates to the message re-director 190 that messages received and destined for terminal sets 1001, 1002, 1003 are to be sent to message re-director 180. In Table 603 the destination address of each of terminal sets 2001, 2002, 2003 within LAN 510 is 000.000.0.0, and indicates that messages received by the message re-director 180 and destined for terminal sets 2001, 2002, 2003 are to be forwarded locally within LAN 510.

In Table 604, the destination address associated with each of terminal sets 1001, 1002, 1003 of LAN 500 is 192.168.2.4 and corresponds to a private IP address of message re-director 190 of LAN 510. This destination address indicates to any one of terminal sets 2001, 2002, 2003 looking up its version of Table 604 that messages destined for terminal sets 1001, 1002, 1003 are to be directed to message re-director 190 of LAN 510. In Table 604, the destination address associated with terminal sets 2001, 2002, 2003 within LAN 510 is 000.000.0.0, and indicates that messages sent by any one of terminal sets 2001, 2002, 2003 to any other one of terminal sets 2001, 2002, 2003 are to be sent locally within LAN 510 and do not need to go through the message re-director 190.

As discussed above, the routing information of FIGS. 6A to 6D is maintained for the purpose of sending messages among the terminal sets 1001, 1002, 1003, 2001, 2002, 2003, particularly across the network 170. An example of how Tables 601, 602, 603, 604 can be used to transmit messages across the network 170 will now be described in detail with reference to FIGS. 7A and 7B.

Figure 7A:
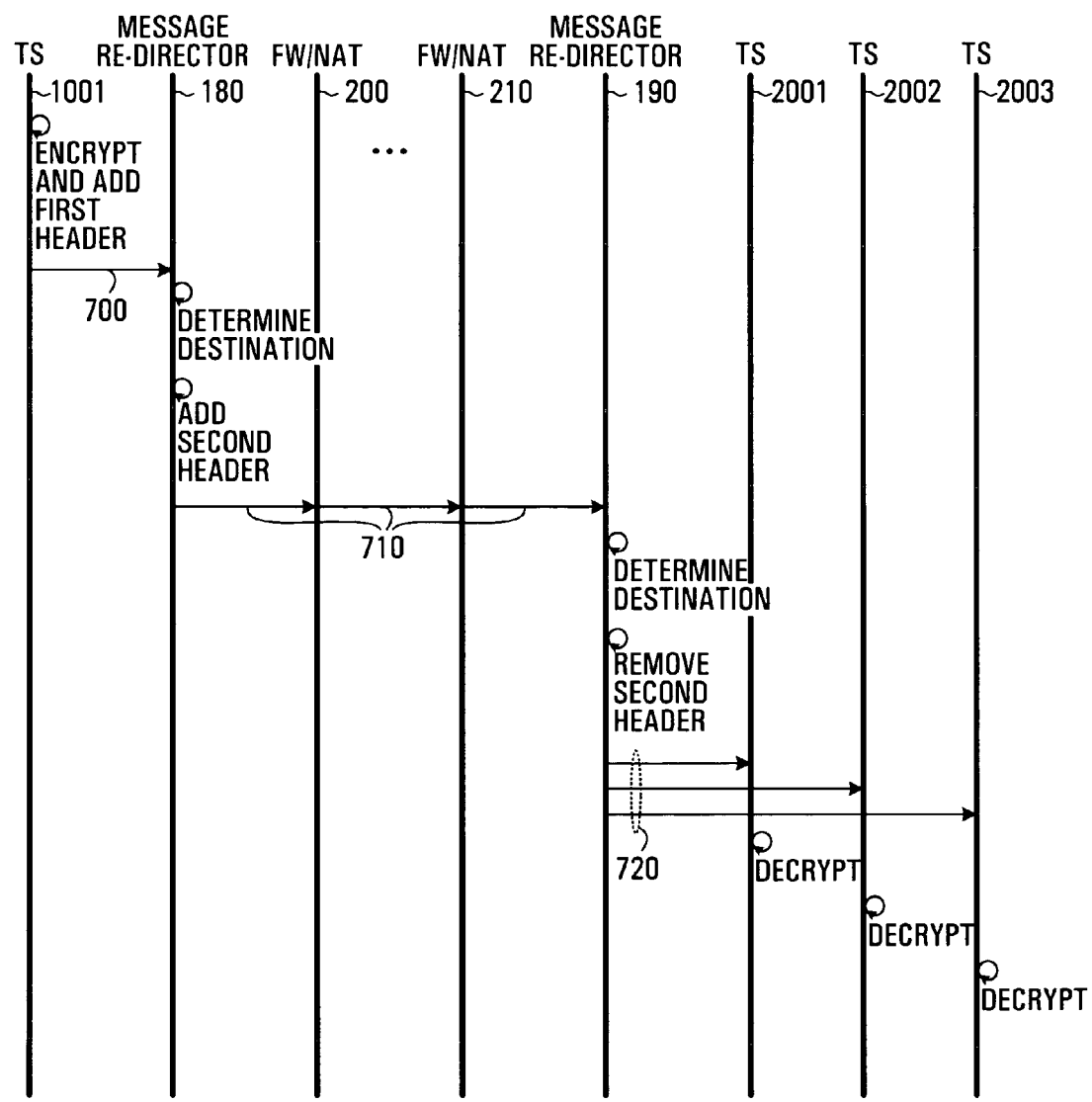
FIG. 7A is a signal flow diagram of multicast messaging used in the system of FIG. 5, according to an example implementation.

In FIG. 7A shown is a signal flow diagram of multicast messaging in system 160 of FIG. 5, according to an example implementation of the method of FIG. 8A. In FIG. 7A, the terminal sets 1001, 1002, 1003, 2001, 2002, 2003 and message re-directors 90, 190 are configured to use a particular multicast address for multicast messaging. The terminal set 1001 encrypts information to be distributed and sends a multicast message 700 containing the information over the LAN 500 to the multicast address. In particular, in the example, the message 700 is a data packet containing a first header and a payload. The first header contains the MAC address of terminal set 1001 and the payload contains the information to be distributed. The MAC address is a unique source identifier used to identify terminal set 1001 as the source of the message 700. More generally, any suitable unique identifier of terminal set 1001 can be used. The message re-director 180 listens on the multicast address and receives the multicast message 700. Responsive to receiving the multicast message 700, the message re-director 180 determines which message re-director, if any, is to receive information contained in the message 700. In the example implementation, the message re-director 180 obtains the public address 193.121.2.4 of message re-director 190 by looking up its Table 602. The message re-director 180 then adds a second header to the packet containing a message type indicator. In this example, the message type indicator is a MAC address 00-00-00-00-00-00. As will be described in more detail below, a MAC address corresponding to 00-00-00-00-00-00 indicates to the message re-director 190 to forward a received message as a multicast message; however, any other suitable indicator may alternately be used. The redirector 180 sends the data packet as a unicast message 710 to the message re-director 190 through FW/NATs 200, 210 using the public IP address of message re-director 190. Responsive to receiving the message 710, the message re-director 190 determines the destination of the data packet. In particular, the message re-director 190 determines which terminal set(s) is to be sent the information using the message type indicator in the second header. In this case, the MAC address is 00-00-00-00-00-00 indicating that the information is to be sent as a multicast message. In this implementation any other MAC address indicates that a unicast message is to be sent. The message re-director 190 removes the second header and sends the data packet as a multicast message 720 to the multicast address. Each one of terminal sets 2001, 2002, 2003 is configured to listen on the multicast address and receives the multicast message 720. Responsive to receiving the multicast message 720, each one of terminal sets 2001, 2002, 2003 decrypts the payload.

It is to be clearly understood that the example implementation of FIG. 7A is only one of many possible ways of distributing information. For example, the message type indicator used in the second header of message 710 is a MAC address 00-00-00-00-00-00; however, any other suitable message type indicator may be used. This might be for example a "1" for identifying the message 710 as a multicast message even though it is being sent using a unicast address, and a "0" for identifying the message 710 as a unicast message. However, as will be shown below, in addition to being used as a message type indicator a MAC address can also be used as a unique destination address for the purpose of sending unicast messages.

The example implementation of FIG. 7A is described for the purpose of illustrating how information can be distributed in system 160 of FIG. 5 using multicast messaging. A method of distributing information using unicast messaging will now be described with reference to FIGS. 5 and 8B for another example implementation.

Figure 8B:
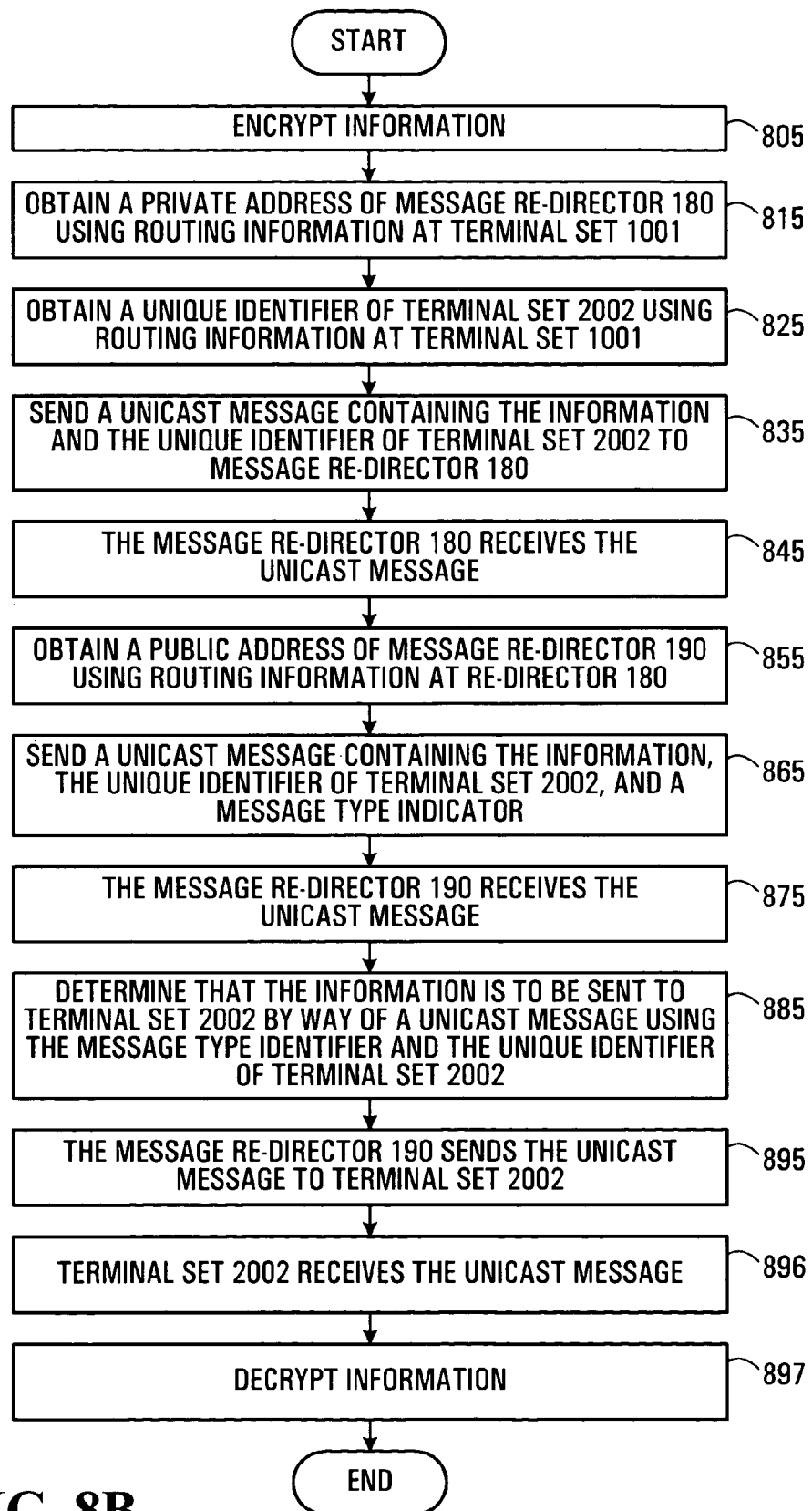
FIG. 8B is a flow chart of a method of sending information from a terminal set of FIG. 5 to another terminal set of FIG. 5 using unicast messaging.

Referring to FIG. 8B, shown is a flow chart of a method of sending information from the terminal set 1001 of FIG. 5 to the terminal set 2002 of FIG. 5 using unicast messaging. In particular, in the method of FIG. 8B the information at the terminal set 1001 is to be sent to terminal set 2002 across the network 170 using unicast messages. At terminal set 1001, information is encrypted (step 805) and at step 815 a private address of message re-director 180 is obtained using routing information at the terminal set 1001. At step 825, a unique identifier of terminal set 2002 is obtained using routing information at terminal set 1001. At step 835, a unicast message containing the information and the unique identifier of terminal set 2002 is sent to message re-director 180. The message re-director 180 receives the unicast message (step 845) and obtains a public address of the message re-director 190 using routing information maintained at message re-director 180 (step 855). The message re-director 180 then sends a unicast message containing the information, the unique identifier of terminal set 2002 and a message type indicator for indicating to message re-director 190 that the unicast message is to be treated as a unicast message (step 865). As discussed below, in some embodiments of the invention the unique identifier and the message type indicator are the same entity. At step 875, the message re-director 190 receives the unicast message and determines that the information is to be sent to terminal set 2002 by way of a unicast message using the message type identifier and the unique identifier of terminal set 2002 (step 885). At step 895, the message re-director 190 sends the unicast message to terminal set 2002. At step 896, the terminal set 2002 receives the unicast message, and decrypts the information (step 897).

It to be clearly understood that the invention is not limited to the method of FIG. 8B for distributing information in system 160 of FIG. 5 using unicast messaging. For example, in another implementation, the encryption step 805 is performed by the message re-director 180 and the decryption step 897 is performed by the message re-director 190. In yet another implementation, there is no encryption and no decryption.

Figure 10:
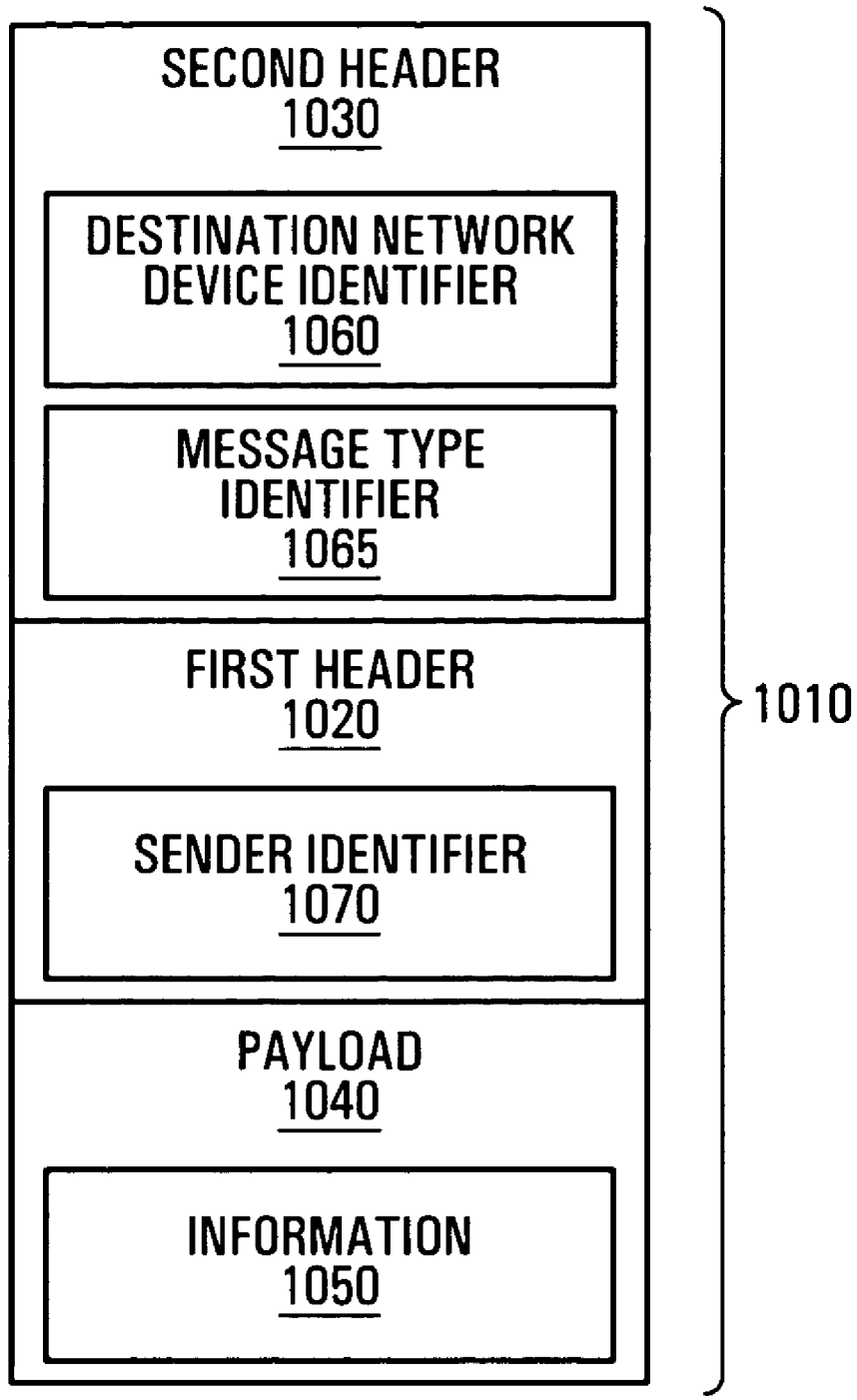
FIG. 10 is a block diagram of a data packet used in an example implementation of the method of FIG. 8B.

The above method of FIG. 8B will now be described in further detail with reference to FIGS. 5, 6A to 6D, 7B, and 10 for an example implementation. In the example implementation, information is once again sent from terminal set 1001 of LAN 500 to terminal set 2002 of LAN 510. In this example implementation the information is sent as part of a data packet. Such a data packet is shown in FIG. 10 as a data packet 1010. The data packet 1010 has a first header 1020, a second header 1030, and a payload 1040. The first header 1020 contains a sender identifier 1070, the sender being terminal set 1001 in this case. The second header 1030 has a destination network device identifier 1060 and has a message type identifier 1065 that identifies the data packet as a data packet intended for multicast messaging. In FIG. 10, the destination network device identifier 1060 and the message type identifier 1065 are shown as separate entities; however, as will now be discussed in this example implementation they are in fact the same entity. In some implementations, however, they are different entities.

Figure 7B:
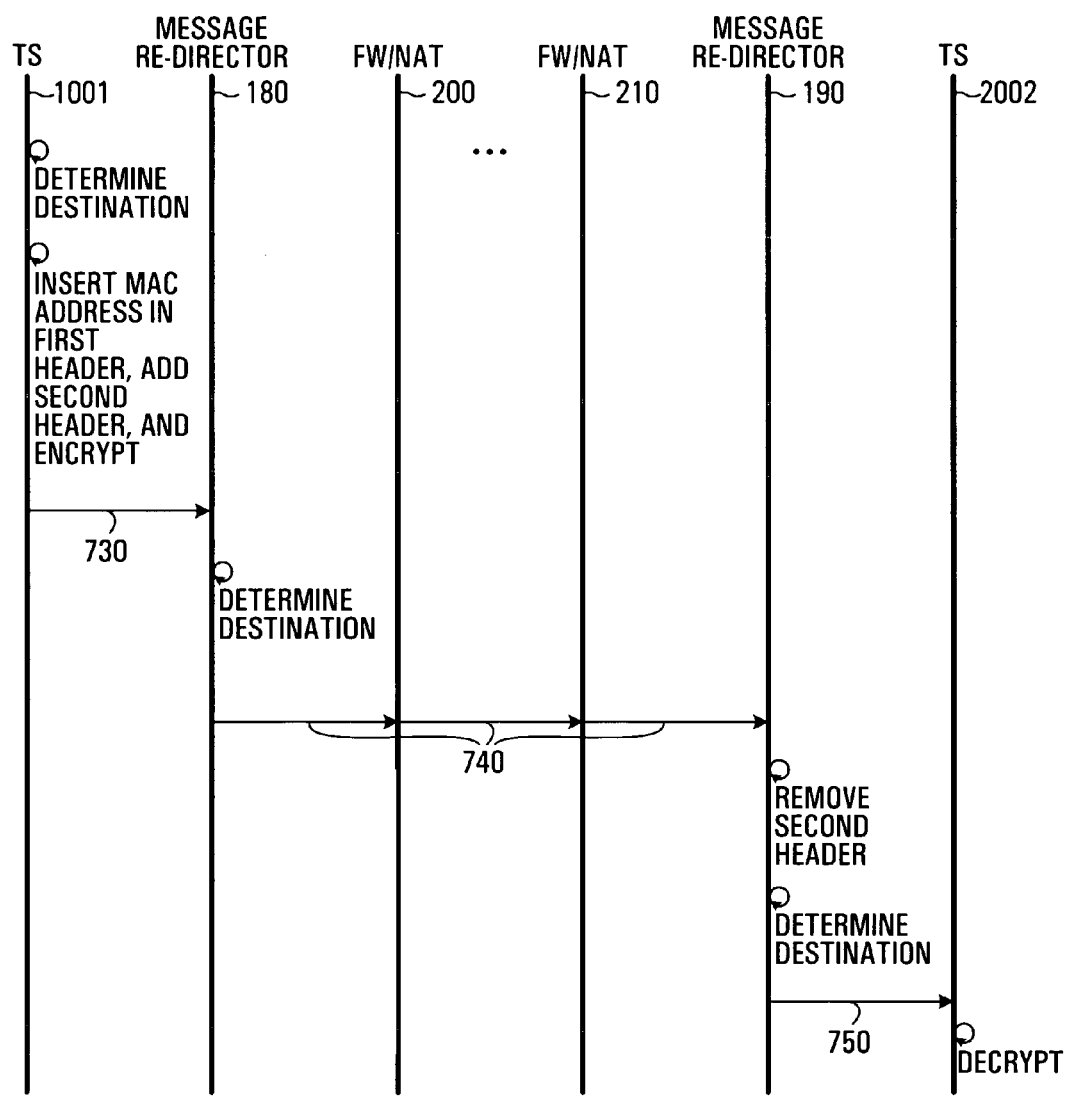
FIG. 7B is a signal flow diagram of unicast messaging used in the system of FIG. 5, according to an example implementation.

In FIG. 7B, the terminal set 1001 determines the destination of the data packet 1010. In particular, the terminal set 1001 determines a unique identifier of terminal set 2002 and determines a destination address to which information is to be sent in order to reach terminal set 2002. In the example implementation, the unique identifier of terminal set 2002 is a MAC address that is looked up in column 630 of the Table 601 of terminal set 1001 and inserted into the second header 1030 as the destination network device identifier 1060 and the message type identifier 1065. In particular, both the message type identifier 1065 and the destination network identifier 1060 correspond to the MAC address 00-05-78-6B-44-B1. Furthermore, the destination address to which information is to be sent in order to reach terminal set 2002 is looked up in column 650 of the Table 601 and corresponds to the private IP address 192.168.1.4 of message re-director 180. The terminal set 1001 inserts the MAC address of terminal set 1001 into the first header 1020 as the sender identifier 1070 and inserts the information to be sent into the payload 1040 as information 1040. The terminal set 1001 then encrypts the payload and sends the data packet 1010 as a unicast message 730 to the message re-director 180 using the private IP address of the message re-director 180. Responsive to receiving the unicast message 730, the message re-director 180 determines a destination of the data packet 1010. In particular, the message re-director 180 determines which message re-director is to receive the information in the unicast message 730. In the example implementation, using the MAC address of terminal set 2002 received in the second header 1030, the message re-director 180 looks up columns 630, 650 of its Table 602 to determine the public IP address 193.121.2.4 of message re-director 190. The message re-director 180 then sends the data packet 1010 as a unicast message 740 to the message re-director 190 using the public IP address of message re-director 190. Responsive to receiving the unicast message 740, the message re-director 190 removes the second header 1030 and determines the destination of the data packet. In the example implementation, using the MAC address of networks device 2002 in the second header 1030 the message re-director looks-up columns 630, 640 and 650 of its Table 603 to determine that the data packet is to be sent locally on LAN 510 to a private IP address 192.168.1.2. In particular, for terminal set 2002, the destination address in column 650 of Table 603 is 000.000.0.0 indicating that the information is to be sent locally and that the private IP address 192.168.1.2 is to be used. The message re-director 190 then sends the data packet as a unicast message 750 to the terminal set 2002 using the private IP address of terminal set 2002. Responsive to receiving message 750, the terminal set 2002 decrypts the payload.

In another implementation encryption/decryption is performed at message redirectors 180, 190. In yet other implementations there is no encryption description.

Referring back to FIGS. 6A to 6D, the routing information contained in Tables 601, 602, 603, 604 is maintained at the terminal sets 1001, 1002, 1003, 2001, 2002, 2003 and the message re-directors 180, 190. The messaging used to populate Tables 601, 602, 603, 604 will now be described with reference to an example messaging scenario in which routing information is distributed. In particular, the example is described with reference to FIGS. 5, 6A to 6D, and 7C in which routing information at terminal set 1001 of LAN 500 of FIG. 5 is distributed to terminal sets 2001, 2002, 2003 of LAN 510 of FIG. 5. This might occur for example after terminal set 1001 has become available on LAN 500 and has determined its DN. The process of obtaining a DN is described in detail in U.S. Provisional Patent Application No. 60/518,646, entitled "PEER-TO-PEER DISCOVERY SYSTEM, METHOD AND NETWORK DEVICES" filed Nov. 12, 2003. In the example implementation, with reference to Table 601 of FIG. 6A, the terminal set 1001 is to distribute its DN 201, its MAC address 00-05-78-6B-44-A7, its private IP address 192.168.1.1, and its destination address 000.000.0.0.

Figure 7C:
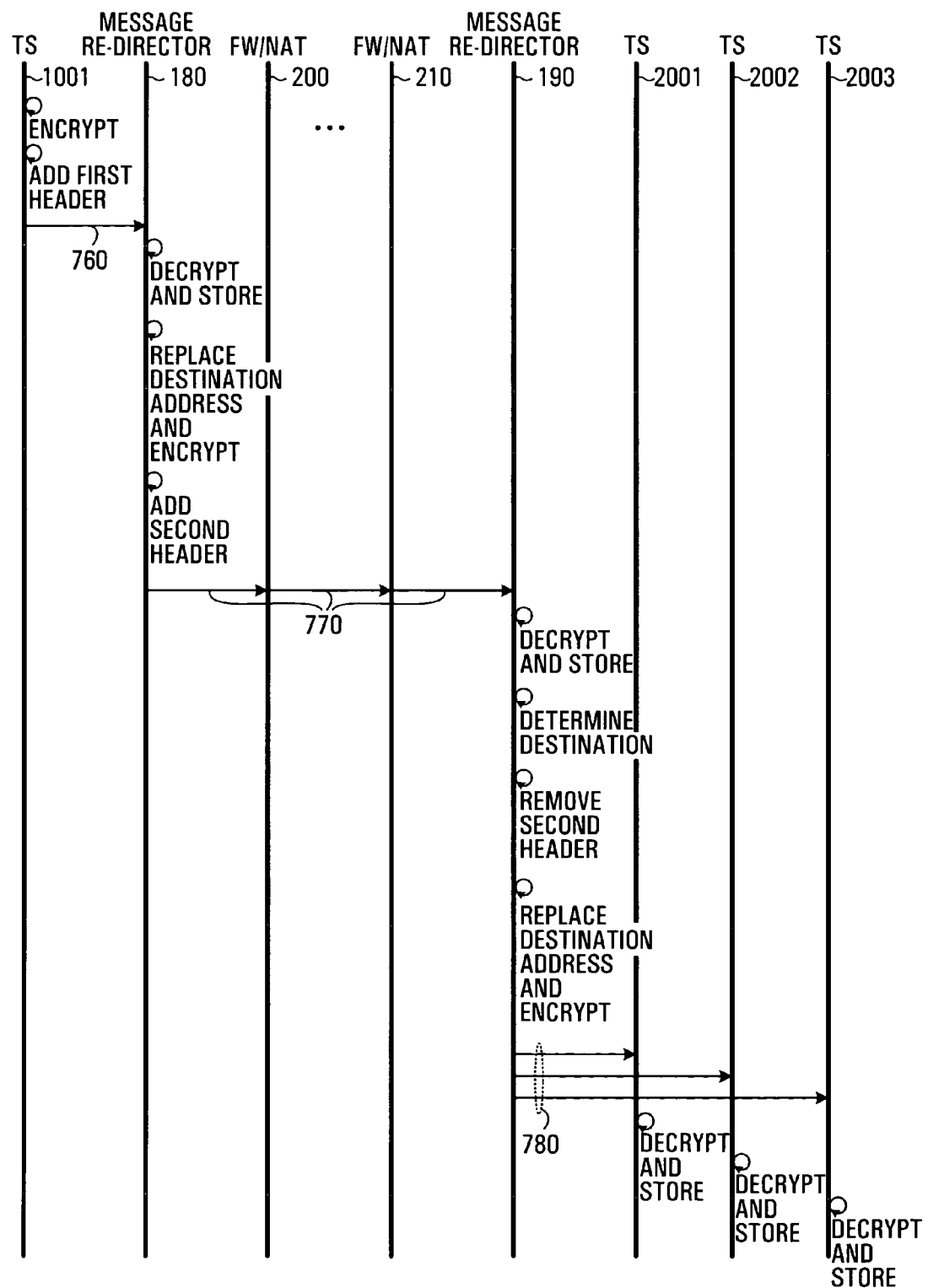
FIG. 7C is a signal flow diagram of multicast messaging used in the system of FIG. 5 for maintaining routing information at terminal sets and message re-directors of the system of FIG. 5, according to an example implementation.

In FIG. 7C, the terminal set 1001 encrypts the routing information to be distributed such as its DN, MAC address, private IP address, and destination address for example, and sends a multicast message 760 containing the routing information to the multicast address. The message re-director 180 listens on the multicast address and receives the message. In particular, in the example, the message 760 is a data packet containing a first header and a payload. The first header contains the MAC address of terminal set 1001 and the payload contains the DN, the private IP address and the destination address of terminal set 1001. Responsive to receiving the multicast message 760, the message re-director 180 decrypts the payload and stores the routing information in its Table 602. In particular, the message re-director 180 stores the DN, the MAC address, the private IP address and the destination address of terminal set 1001 in columns 620, 630, 640, and 650, respectively, of its Table 602. In the data packet received, the message re-director 180 replaces the destination address 000.000.0.0 received as part of the routing information with its public IP address 193.168.1.4, and encrypts the payload. In other implementations both the payload and the first header are encrypted. The message re-director 180 then adds a second header to the packet containing a message type indicator. In this case, the routing information is distributed by way of multicast messaging and the message type indicator is a MAC address 00-00-00-00-00-00. The redirector 180 sends the data packet as a unicast message 770 to the message re-director 190 through FW/NATs 200, 210 using the public IP address of message re-director 190. Responsive to receiving the message 770, the message re-director 190, decrypts the payload and stores the routing information in its Table 603. In particular, the message re-director 190 stores the DN, the MAC address, and the private IP address of terminal set 1001 in columns 620, 630, and 640, respectively, of its Table 603. The message re-director 190 also stores the public IP address 193.121.1.4 of message re-director 180 in column 650 of it Table 603. The message re-director 190 determines which terminal set(s) is to be sent the routing information using the message type indicator in the second header. In this case, the message type indicator is 00-00-00-00-00-00 indicating that the routing information is to be sent as a multicast message. The message re-director 190 removes the second header. The message re-director 190 also replaces the destination address received as part of the routing information, which corresponds to the public IP address 193.121.1.4 of message re-director 180, with its private IP address 192.168.2.4 and encrypts the payload. The message re-director 190 then sends the data packet as a multicast message 780 containing the DN, MAC address, and private IP address of terminal set 1001 together with its private IP address 192.168.2.4 as a destination address, to the multicast address. The terminal sets 2001, 2002, 2003 are configured to listen in on the multicast address and receive the multicast message 780. Responsive to receiving the multicast message 780, each one of terminal sets 2001, 2002, 2003 decrypts and stores the routing information received. In particular, each one of terminal sets 2001, 2002, 2003 stores in columns 620, 630, and 640 of its version of Table 604 the DN, MAC address, and private IP address, respectively, of terminal set 1001. Each one of terminal sets 2001, 2002, 2003 also stores in column 650 of its Table 604 the destination address received which happens to be the private address 192.168.2.4 of message re-director 190.

Numerous modifications and variations of the present invention are possible in light of the above teachings. It is therefore to be understood that within the scope of the appended claims, the invention may be practised otherwise than as specifically described herein.

We claim:

1. A method comprising:
receiving at a message re-director a received unicast message containing information and a message type identifier;
determining at the message re-director whether the information is to be forwarded as a unicast message or a multicast message using the message type identifier;
if the message type identifier indicates that the information is to be forwarded as a multicast message, sending a multicast message from the message re-director containing the information;
if the message type identifier indicates that the information is to be forwarded as a unicast message, sending from the message re-director a first other unicast message containing the information; and
performing the determining whether the information is to be forwarded as a unicast message or a multicast message using the message type identifier on the basis of whether the message type identifier identifies a unique identifier of a network device,
wherein the first other unicast message is sent to the network device if the message type identifier identifies the unique identifier of the network device.

2. A message re-director comprising:
a memory adapted to store first instructions;
an interface adapted to receive a received unicast message containing information and a message type identifier; and
a processor adapted to, using the first instructions:
i) determine whether the information is to be forwarded as a unicast message or a multicast message using the message type identifier;
ii) if the message type identifier indicates that the information is to be forwarded as a multicast message, provide second instructions for sending a multicast message containing the information; and
iii) if the message type identifier indicates that the information is to be forwarded as a unicast message, provide third instructions for sending a first other unicast message containing the information,
wherein the processor is adapted to determine whether the information is to be forwarded as a unicast message or a multicast message on the basis of whether the message type identifier identifies a unique identifier of a network device; and if the message type identifier identifies the unique identifier of the network device, provide fourth instructions for sending the first other unicast message to the network device.

3. An article of manufacture comprising:
a computer usable medium having computer readable program code means embodied therein, the computer readable code means in the article of manufacture comprising:
computer readable code means for, responsive to receiving a received unicast message containing information and
a message type identifier determining whether the information is to be forwarded as a unicast message or a multicast message using the message type identifier;
computer readable code means for, if the message type identifier indicates that the information is to be forwarded as a multicast message providing first instructions for sending a multicast message containing the information;
computer readable code means for, if the message type identifier indicates that the information is to be forwarded as a unicast message providing second instructions for sending a first other unicast message containing the information;
computer readable code means for, determining whether the information is to be forwarded as a unicast message or a multicast message using the message type identifier on the basis of whether the message type identifier identifies a unique identifier of a network device, and
computer readable code means for providing third instructions for sending the first other unicast message to the network device if the message type identifier identifies the unique identifier of the network device.

4. A message re-director comprising:
a memory adapted to store first instructions;
an interface adapted to receive a received unicast message containing information and a header including a message type identifier; and
a processor adapted to, using the first instructions:
i) determine whether the information is to be forwarded as a unicast message or a multicast message using the message type identifier;
ii) if the message type identifier indicates that the information is to be forwarded as a multicast message, provide second instructions for sending a multicast message containing the information; and
iii) if the message type identifier indicates that the information is to be forwarded as a unicast message, provide third instructions for sending a first other unicast message containing the information,
wherein the message re-director is selected from the group consisting of a VoIP telephone, a packet based telephone, a video phone, a personal computer, a personal digital assistant, a soft phone, a wireless device and a wireless telephone.

5. A message re-director comprising:
a memory adapted to store first instructions;
an interface adapted to receive a received unicast message containing information and a header including a message type identifier; and
a processor adapted to, using the first instructions:
i) determine whether the information is to be forwarded as a unicast message or a multicast message using the message type identifier;
ii) if the message type identifier indicates that the information is to be forwarded as a multicast message, provide second instructions for sending a multicast message containing the information; and
iii) if the message type identifier indicates that the information is to be forwarded as a unicast message, provide third instructions for sending a first other unicast message containing the information,
wherein the message redirector comprises a VoIP telephone.

\* \* \* \* \*